United States Patent [19]

Sidebottom

[11] Patent Number: 4,636,888
[45] Date of Patent: Jan. 13, 1987

[54] CHANGER APPARATUS WITH MOVABLE MEANS FOR WITHDRAWING RECORDING MEDIA FROM AN INPUT HOPPER TO A RECORDING DECK TO AN OUTPUT HOPPER

[75] Inventor: Philip L. Sidebottom, Fairfield, Conn.

[73] Assignee: Dictaphone Corporation, Rye, N.Y.

[21] Appl. No.: 629,212

[22] Filed: Jul. 9, 1984

[51] Int. Cl.$^4$ ............................................. G11B 15/68
[52] U.S. Cl. ..................................................... 360/92
[58] Field of Search .................................... 360/92, 98

[56] References Cited

U.S. PATENT DOCUMENTS

| | | | |
|---|---|---|---|
| 3,603,597 | 9/1971 | Haake | 360/92 |
| 3,756,608 | 9/1973 | O'Neill et al. | 360/92 |
| 3,758,122 | 9/1973 | Kawaharasaki | 360/92 |
| 3,767,207 | 10/1973 | Okabe | 360/92 |
| 3,800,319 | 3/1974 | Fujimoto et al. | 360/92 |
| 4,092,685 | 5/1978 | Sander et al. | 360/92 |
| 4,195,321 | 3/1980 | Chelin et al. | 360/92 |

FOREIGN PATENT DOCUMENTS

| | | |
|---|---|---|
| 1424561 | 2/1976 | United Kingdom . |
| 1591253 | 6/1981 | United Kingdom . |

Primary Examiner—Robert S. Tupper
Attorney, Agent, or Firm—Curtis, Morris & Safford

[57] ABSTRACT

Changer apparatus of the type having an input hopper for storing a plurality of recording media and an output hopper for storing recording media that have had messages recorded thereon by a recording deck. A movable withdrawing element withdraws a recording medium from the input hopper and transports it to a receiving device which operates to dispose that recording medium to the recording deck. The receiving device is further operable to remove the recording medium from the recording deck to the output hopper. A rotatable cam is drivingly coupled to the movable withdrawing element and includes a cam surface coupled to the receiving device whereby the receiving device is driven to remove one recording medium from the recording deck to the output hopper and then to receive the next recording medium from the withdrawing element to dispose that medium to the recording deck. Preferably, the withdrawing element takes the form of a pusher arm to push the bottommost recording medium from the input hopper to the receiving device; and the receiving device preferably is in the form of an elevator which lowers that recording medium onto the recording deck and then, after one or more messages have been recorded, lifts that recording medium to the bottom of the output hopper.

16 Claims, 23 Drawing Figures

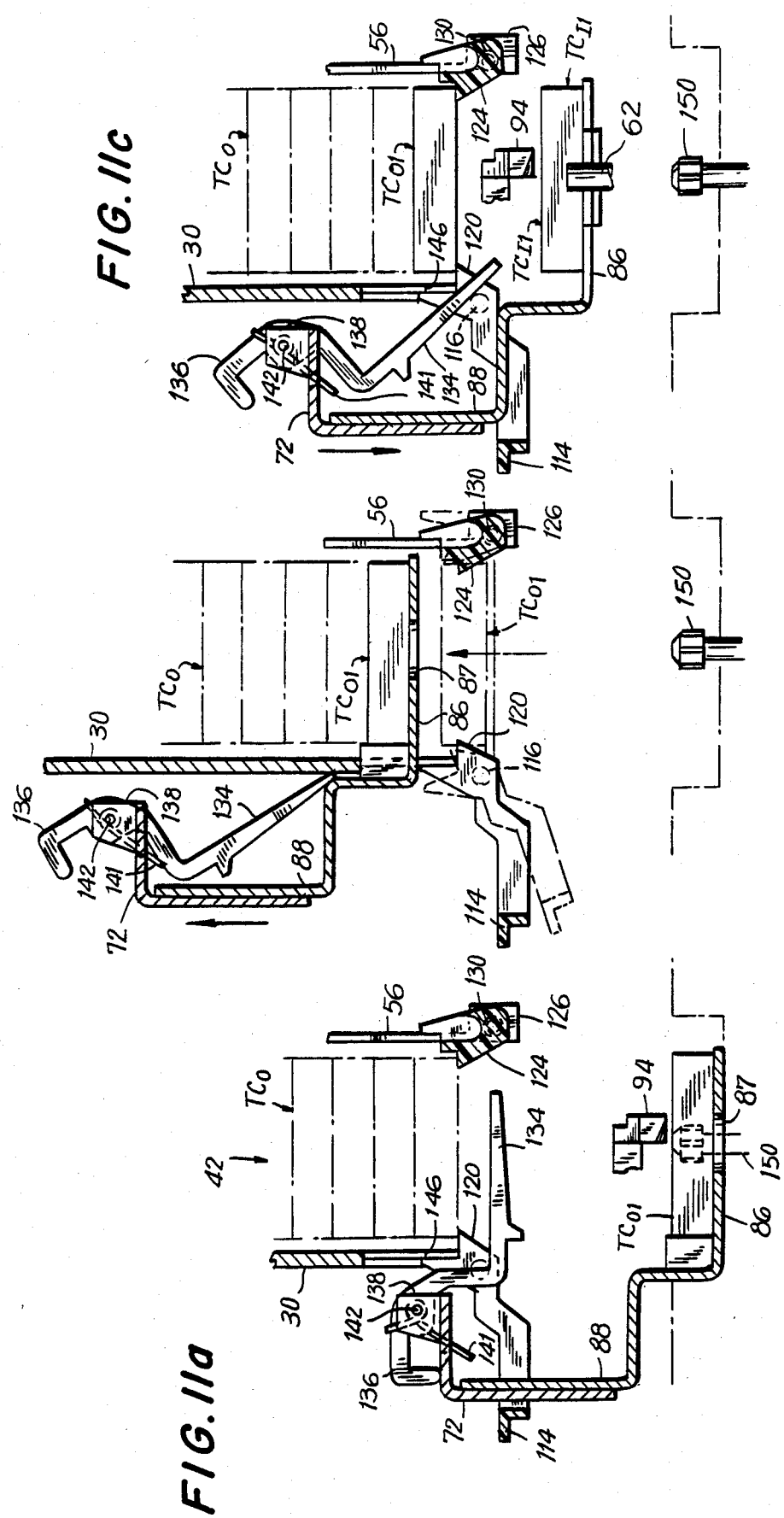

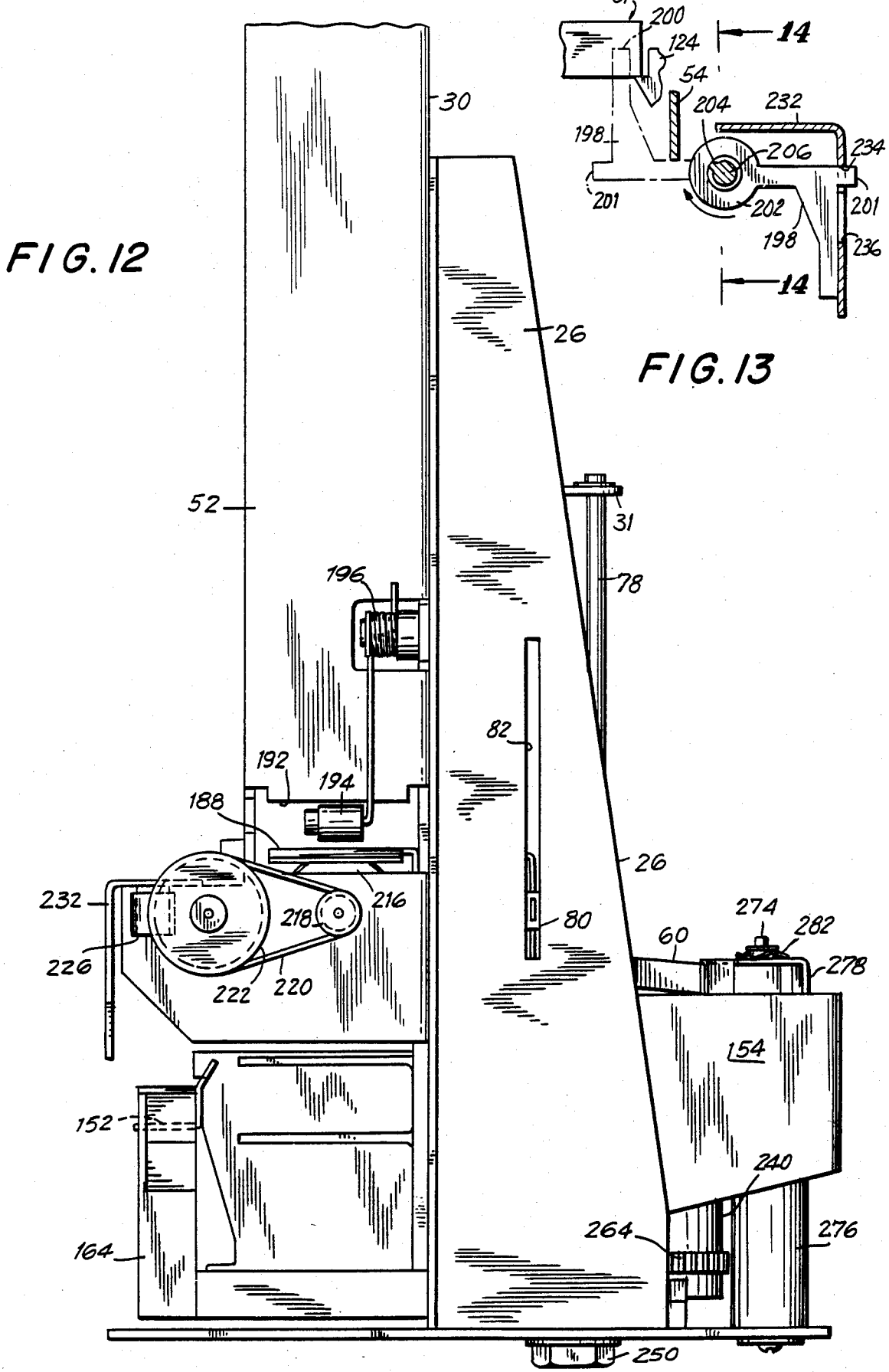

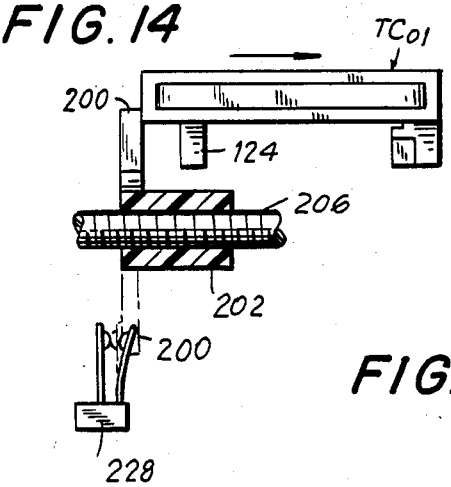
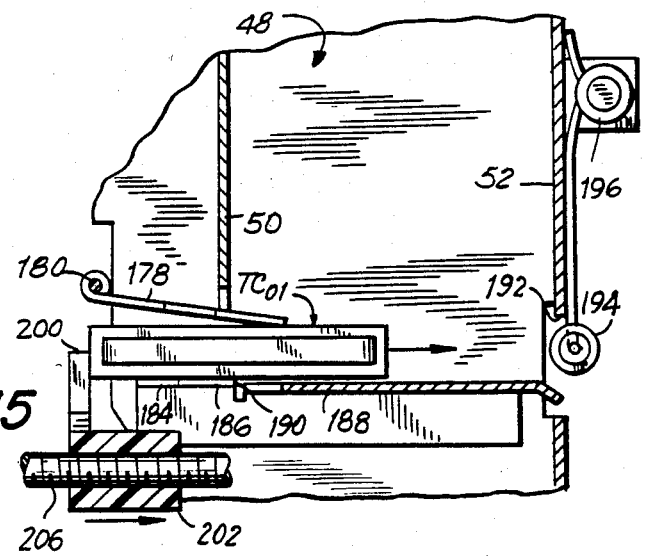
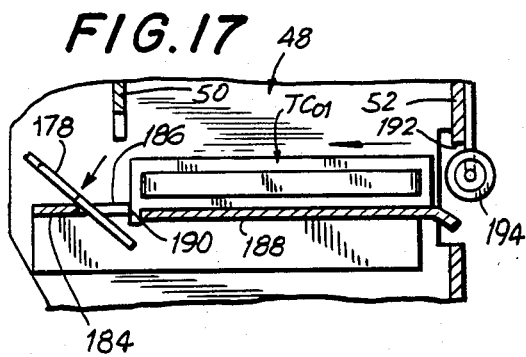
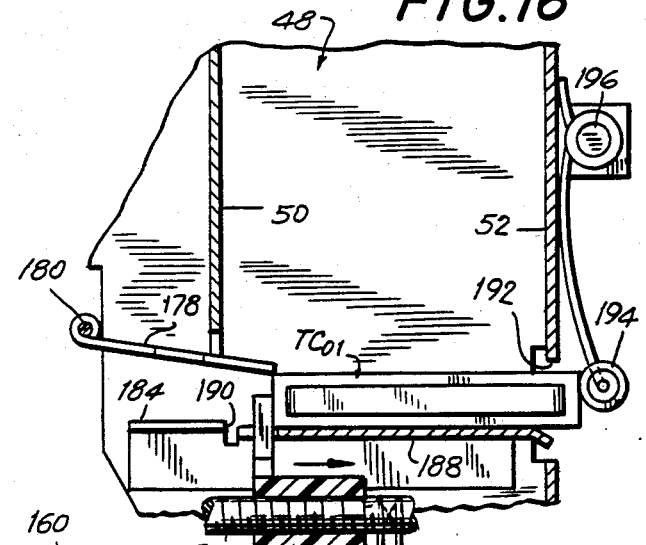
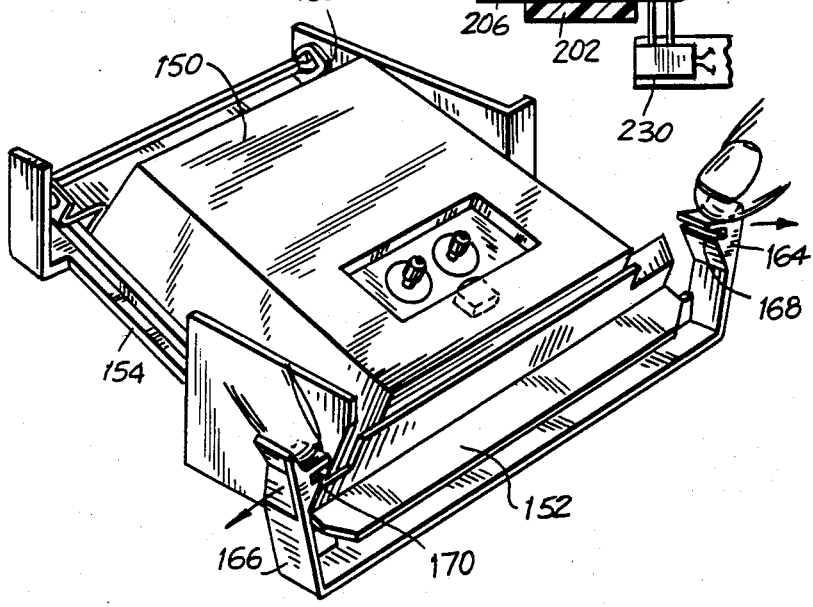

CHANGER APPARATUS WITH MOVABLE MEANS FOR WITHDRAWING RECORDING MEDIA FROM AN INPUT HOPPER TO A RECORDING DECK TO AN OUTPUT HOPPER

BACKGROUND OF THE INVENTION

This invention relates to recording/reproducing apparatus and, more particularly, to a changer apparatus which operates with a record/playback deck to bring fresh recording media (for recording messages or for transcribing or playing back information) to that deck and to remove used media (i.e., those media on which messages have been recorded or played back) from that deck.

In the field of dictation, central systems having, for example, a centrally disposed recorder selectively coupled to one of several dictating stations, as by a dedicated communication link (e. g. "hard-wired") or by telephone, have become popular. In one type of central dictation system, messages, such as letters, reports, memoranda and the like, are recorded on discrete recording media such as magnetic tape cassettes. Depending upon the preset parameters established by the users of the dictation system, a cassette having one or more messages recorded thereon is replaced automatically with a fresh cassette to permit further messages to be recorded. The messages that have been recorded on the used cassette then are transcribed by, for example, a conventional desk-top transcribing machine. A similar central system has been used for transcribing messages from cassettes, wherein a cassette is replaced when transcription of the messages recorded thereon has been completed.

By centrally disposing the recorder, access thereto is presented to several dictators who are furnished with respective dictating stations or with so-called telephone dictation modules from which messages may be transmitted, and which operate to control the usual dictating functions, such as record, playback, rewind, fast forward and the like. After one dictator has terminated his usage of the centrally disposed recorder, the recorder is made available to be accessed by another. Typically, the recording medium, or cassette, on which the dictator has dictated his messages may be replaced, or ejected, after a predetermined length of tape has been consumed, or after a predetermined number of messages have been recorded, or after a predetermined number of different dictators have recorded messages thereon or after a predetermined amount of time has elapsed since the first message was recorded. Examples of central dictation systems using cassette changers are described in, for example, U.S. Pat. Nos. 4,071,857; 4,092,679; 4,092,685; and 4,099,209.

In the cassette changer central dictation systems of the type described in the aforementioned patents, a cassette is transported via a conveyor-type mechanism from an input supply, or stack, to a recording deck. The deck is mounted in a movable support which positions that deck in operable relation with the cassette that has been transported thereto. Then, after the predetermined length of tape has been consumed, or after the preset number of messages have been recorded, or after the preset number of dictators have used the cassette, or after a predetermined duration of inactivity has elapsed, the deck is displaced and the conveyor mechanism continues in its transportation of the used cassette to an output stack. Concurrently with this ejection of the cassette from the recording deck, a fresh cassette is transported by the conveyor mechanism from the input stack to that deck. As also described in the aforementioned patents, if a cassette has been designated a "priority" cassette, that is, if the message or messages recorded on that cassette are to be transcribed promptly and on a "priority" basis, the used cassette is discharged to a special priority discharge chute. There, the "priority" cassette may be given to a transcriptionist immediately. The transcription of such "priority" cassettes need not be deferred until all other used cassettes which precede that "priority" cassette have been transcribed.

The cassette changer apparatus of the aforedescribed type has been provided with one motor to drive the cassette-conveyor mechanism, another motor to drive the recording deck into operable relation with the cassette, and yet another motor to lift the used cassette into the output stack. The operation of all three motors is coordinated by electronic logic circuitry which, in one embodiment has been implemented in the form of discrete components and in another embodiment has been implemented in the form of a specially programmed microprocessor.

Other cassette changer devices have been known. For example, a shuttle carriage has been proposed for transporting, or "shuttling," a cassette from a horizontal input stack to a recording deck and then, after one or more messages have been recorded, from that deck to a horizontal output stack. Another example, similar to a photographic slide projector, displaces a cassette from an input magazine, lowers that cassette onto a recording deck, returns the used cassette from the deck to the magazine, and then advances the magazine to access the next cassette therein. A further example is provided with a vertical input stack of cassettes from which the bottommost cassette is lowered onto a recording deck and then, after one or more messages have been recorded, that cassette is lifted from the deck and discharged.

One problem attending many of the aforementioned changers resides in the coordination of removing a used cassette from the recording deck and replacing it with a fresh cassette from an input supply. Typically, separate drive motors are used to transport a fresh cassette to the recording deck, load that cassette onto the deck, and eject a used cassette from that deck to an output port. It is appreciated that such coordination may be achieved by electronic control circuitry or microprocessors, as mentioned above, or by a relatively complex mechanical interlocking arrangement. The use of plural drive motors, control electronics, and mechanical interlocking arrangements is relatively expensive and moreover, may be difficult to service in the event that maintenance or repairs become necessary.

The present invention proceeds by using a relatively simple drive arrangement which inherently provides proper coordination among the various cassette-changing operations—transporting a fresh cassette to the recording deck, disposing that cassette in operable relation with the deck and ejecting a used cassette from the deck to a suitable output port. Moreover, the operating principles of the present invention permit it to be readily adapted for use as a cassette changer with standard size cassettes, with minicassettes, with microcassettes or with the new extremely small cassette described in, for example, U.S. Pat. No. 4,443,827.

OBJECTS OF THE INVENTION

Therefore it is an object of the present invention to provide improved changer apparatus for use with recording media, such as recording media housed in cartridges or cassettes.

Another object of this invention is to provide improved changer apparatus of the aforementioned type which is of relatively simple construction yet exhibits accurate operation, and is relatively simple and inexpensive to maintain and/or repair.

Another object of this invention is to provide in changer apparatus of the aforementioned type a single motor which operates to transport a cassette from an input stack to a recording deck and further operates to eject a used cassette from that deck to an output stack.

An additional object of this invention is to provide changer apparatus of the aforementioned type which permits a "priority" designated cassette to be transported to a suitable priority location from which it can be retrieved and transcribed on a priority basis.

A further object of this invention is to provide changer apparatus of the aforementioned type having a recording deck which can be easily and readily accessed for relatively simple repairs or maintenance without requiring dismantling or disassembling of substantial portions of the apparatus.

It is yet another object of this invention to provide cassette guiding apparatus that accurately guides a cassette into proper registration and correct alignment on a record/playback deck in changer apparatus of the aforementioned type.

Another object of this invention is to provide changer apparatus which can be used with different types of recording media, such as standard size cassettes, minicassettes, microcassettes, cassettes of even smaller size, and other types of recording media, preferably housed in cartridges.

Another object of this invention is to provide changer apparatus of the aforementioned type in which a cam is driven by a single drive motor and functions to coordinate the individual steps which constitute a changing operation for recording media, such as a cassette-changing operation.

Various other objects, advantages, and features of the present invention will become readily apparent from the ensuing detailed description, and the novel features will be particularly pointed out in the appended claims.

SUMMARY OF THE INVENTION

In accordance with this invention, changer apparatus is provided with an input hopper for storing a plurality of recording media, such as magnetic tape cassettes, and an output hopper for storing cassettes that have had messages recorded thereon by a recording deck. A movable withdrawing element operates to withdraw a cassette from the input hopper and deliver that cassette to a receiving device which, in turn, disposes that cassette to the recording deck. The receiving device is further operable to remove a cassette from the recording deck to the output hopper before receiving the withdrawn cassette. A rotatable cam is drivingly coupled to the withdrawing element and further includes a cam surface coupled to the receiving device, whereby the receiving device is driven to remove one cassette from the recording deck to the output hopper and replace it with the next cassette.

In accordance with one feature of this invention, the withdrawing element is comprised of a pusher arm coupled to the cam by a pin connection so as to reciprocate between opposite extreme positions as the cam makes one complete rotation. As one aspect, the pusher arm is provided with a groove in which the pin connection rides, the pusher arm being biased toward the pin connection and being angled such that, as the pin connection rides in the groove, the pusher arm is driven in a direction substantially normal to its reciprocating direction, thereby exhibiting a withdrawing movement in one plane and a return movement in another.

In accordance with another feature of this invention, the receiving device is comprised of an elevator having a platform for supporting a cassette and a cam-follower which cooperates with the cam surface to raise this platform from the recording deck to the output hopper which, advantageously, is in the form of a vertical stack located above the recording deck, and then return the platform from the output hopper to an intermediate position to receive the withdrawn cassette and then lower that cassette onto the recording deck. As one aspect, the elevator includes at least one hold-down arm to maintain a cassette on the platform, the hold-down arm being swingable out of interference with the cassette when the platform is raised, thereby permitting that cassette to be positioned at the bottom of the output hopper.

As yet another feature of this invention, priority discharge apparatus is provided to selectively remove a predetermined cassette from the output hopper in the event that cassette has been designated a "priority" cassette. More particularly, if the last cassette which has been ejected from the recording deck to the output hopper has been designated a priority cassette, the priority discharge mechanism is operated to transport that cassette from the output hopper to a priority hopper. As one aspect, the priority discharge apparatus includes a movable finger for engaging the bottommost cassette in the output hopper, this finger being coupled by a lead-screw follower to a lead screw. The lead screw is driven in one direction to advance the finger so as to eject a cassette from the output hopper, and in the opposite direction after the ejected cassette has been transported to the priority hopper so as to return that finger to a "standby" position.

As yet another feature of this invention, the recording deck is supported at a location below the transport path followed by the cassette as it is withdrawn from the input hopper. Advantageously, the recording deck is pivotally supported at one end thereof and releasably supported at another end to enable the recording deck to pivot to a nonoperating position and thereby permit access thereto by an operator. As one aspect of this feature, the recording deck is supported in a frame having a pair of flexible spaced-apart ears which are biased toward each other, the recording deck being mounted on a support plate that is supported by these spaced-apart ears.

Still another feature of this invention is to provide a cassette guide leading to the record deck to locate the cassette in proper registration and alignment on the deck. The cassette guide may be formed of unitary construction and includes a pair of laterally spaced angular guide ramps that contact one or the other or both of the side edges of the cassette that is lowered, thereby aligning that cassette with the usual operating elements, such as drive spindles, capstan, transducer, normally provided on the deck. The cassette guide also includes a front abutment for engaging the front edge of the cassette and at least one rear guide element for contacting the rear edge of the cassette. The rear guide element preferably is resilient to urge the cassette against the front abutment. Additionally, upstanding guide pins are included in the cassette guide to register with guide openings in the cassette.

BRIEF DESCRIPTION OF THE DRAWINGS

The following detailed description, given by way of example, and not intended to limit the present invention solely thereto, will best be understood in conjunction with the drawings, also intended not to limit this invention solely to such illustrations in which:

FIGS. 11A, 11B and 11C are side views taken along lines 11A—11A, 11B—11B and 11C—11C of FIGS. 8, 9 and 10, respectively, illustrating the respective positions of the elevator, cassette-support latches and a blocking member, all described in greater detail below;

FIG. 12 is a right side view of a changer apparatus, taken along the line 12—12 of FIG. 2;

FIG. 13 is a side sectional view of the priority eject mechanism used with the present invention;

FIG. 14 is a front sectional view taken along the line 14—14 in FIG. 13 and illustrating the manner in which a "priority" cassette is ejected from the output hopper;

FIG. 15 is a sectional view representing the transport of the "priority" cassette by the priority eject mechanism toward the priority hopper;

FIG. 16 is a sectional view representing the manner in which the "priority" cassette is fully transported into the priority hopper;

FIG. 17 is a sectional view representing the final disposition of the "priority" cassette into the priority hopper;

FIG. 18 is a perspective schematic view representing the manner in which the recording deck is releasably supported in the changer apparatus;

DETAILED DESCRIPTION OF A PREFERRED EMBODIMENT

The Overall Changer Apparatus

Figure 1:
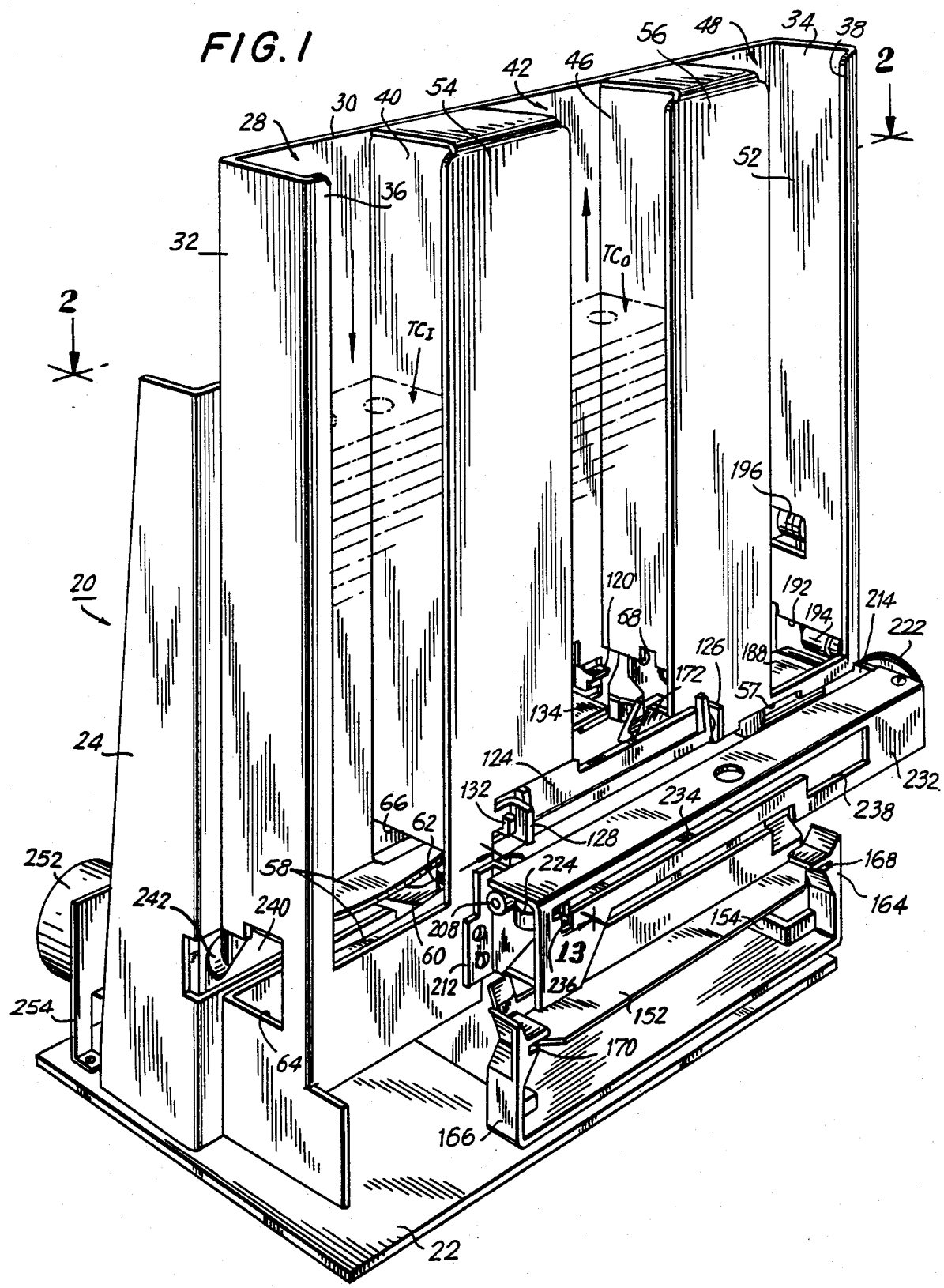
FIG. 1 is a perspective front view of an embodiment of the present invention.

In the interest of simplification, the recording medium with which the changer apparatus of the present invention is described herein is assumed to be a magnetic tape cassette. It will be appreciated, however, that other discrete recording media can be used, such as magnetic disks, magnetic tape cartridges, and other discrete recording media. The term "cassette" as used herein is intended to refer not only to conventional magnetic tape cassettes but also to such other discrete recording media. Furthermore, it will be appreciated that the cassettes with which the changer apparatus of the present invention can be used may be standard size cassettes, minicassettes, microcassettes, or the even smaller cassettes described in U.S. Pat. No. 4,443,827. The term "cassette" is, of course, intended to refer to any or all of these magnetic tape cassettes and discrete recording media.

Referring now to the drawings, in which like reference numerals are used throughout, the cassette changer apparatus of the present invention is identified generally by reference numeral 20 and is intended to be used either with a single dictating station from which a dictator may record one or more messages on a cassette, as will be described, or with a central dictation system, by which cassette changer 20 is electrically connected to a selected one of several dictating stations, as by a hard-wired connection or by telephone, whereby any one of several dictators individually may record messages on a cassette. Cassette changer 20 is comprised of a base 22, opposite side supports 24 and 26 (shown in FIGS. 1, 2, 6 and 7), and a U-shaped rear panel 30 which extends between and beyond side supports 25, 26. One leg 32 of U-shaped rear panel 30 cooperates with a side wall 40 and a portion of the rear panel to form an input hopper 28 which is adapted to receive a stack of cassettes, referred to herein as input cassettes $TC_I$. As best shown in FIGS. 1 and 8–10, an output hopper 42 is formed by a pair of side walls 44 and 46 which are supported by and extend forwardly of rear panel 30. Output hopper 42 is adapted to store a stack of used cassettes, that is, cassettes which have been ejected from the recording deck (described below) and upon which one or more messages have been recorded. The cassettes which are stored in output hopper 42 are referred to herein as output cassettes $TC_O$. Finally, and optionally, a priority hopper 48 is formed of the remaining leg 34 of U-shaped rear panel 30 (FIG. 1) which forms a side wall 52, in combination with yet another side wall 50, this being best illustrated in FIGS. 8–10. Priority hopper 48 thus is seen to be formed of two side walls 50 and 52 in combination with a portion of rear panel 30. Preferably, although not necessarily, the spacing between input hopper 28 and output hopper 42 is shielded by a front panel 54 which extends between side walls 40 and 44; and, similarly, the spacing between output hopper 42 and priority hopper 48 is shielded by a front panel 56 which extends between side walls 46 and 50.

Input cassettes $TC_I$ are properly maintained in input hopper 28 and are prevented from being inadvertently misaligned or discharged therefrom by the projection of flange 36 (which extends from leg 32 of U-shaped rear panel 30) and by a similar projection of front panel 54, these projections serving to partially block the front wall of each cassette in the input hopper. Similarly, projections of front panels 54 and 56 serve to prevent the inadvertent misalignment or discharge of cassettes in the output hopper; and similar projections are provided by flange 38 of leg 34 and a projection of front panel 56, thereby preventing the accidental misalignment or discharge of cassettes from priority hopper 48. Front panel 56 is seen to end in a bottom edge 57 (FIG. 1); and this front panel, together with front panel 54 and rear panel 30 may be of one-piece construction. The particular machining, manufacturing and construction of these elements is not critical. Suffice it to say that an input hopper, an output hopper and a priority hopper are formed. The manner in which cassettes are transported between these hoppers will be described below.

Disposed within and, more accurately, below, input hopper 28 is a cassette support platform 58, seen in FIGS. 1 and 2. The stack of input cassettes $TC_I$ is supported on cassette support platform 58. A slot 59 (best seen in FIG. 2) is formed in the cassette support platform to permit an upstanding finger 62 of a pusher arm 60 to move through the slot. As will be described in greater detail below, pusher arm 60 is reciprocatingly driven such that upstanding finger 62 thereof contacts a side wall of the bottommost cassette within input hopper 28 to withdraw, or push, that cassette from the input hopper and onto a receiving platform which operates to dispose that cassette at the recording deck. As will be described, pusher arm 60 is driven about a pivot axis 274 (FIG. 2) in left-to-right direction to withdraw the bottommost cassette from input hopper 28, and then this pusher arm is pivoted in the right-to-left direction about pivot axis 274 to return to the position whereby it is positioned to withdraw the next cassette from the input hopper. That is, as best shown in FIG. 2, pusher arm 60 is reciprocatingly driven from the position represented by broken lines to that represented by the solid lines and then to return to that position represented by the broken lines. As will be described, when returning from its rightmost position to its leftmost position, pusher arm 60 is displaced to a lower horizontal plane so as to return to its leftmost position without interfering with the stack of cassettes stored in input hopper 28.

As illustrated in FIG. 2, when in its leftmost position, pusher arm 60 extends beyond leg 32. As shown in FIG. 1, this leg is provided with an opening 64 therein to permit the extremity of pusher arm 60, and particularly finger 62 thereof, to pass out of and then re-enter input hopper 28.

Figure 2:
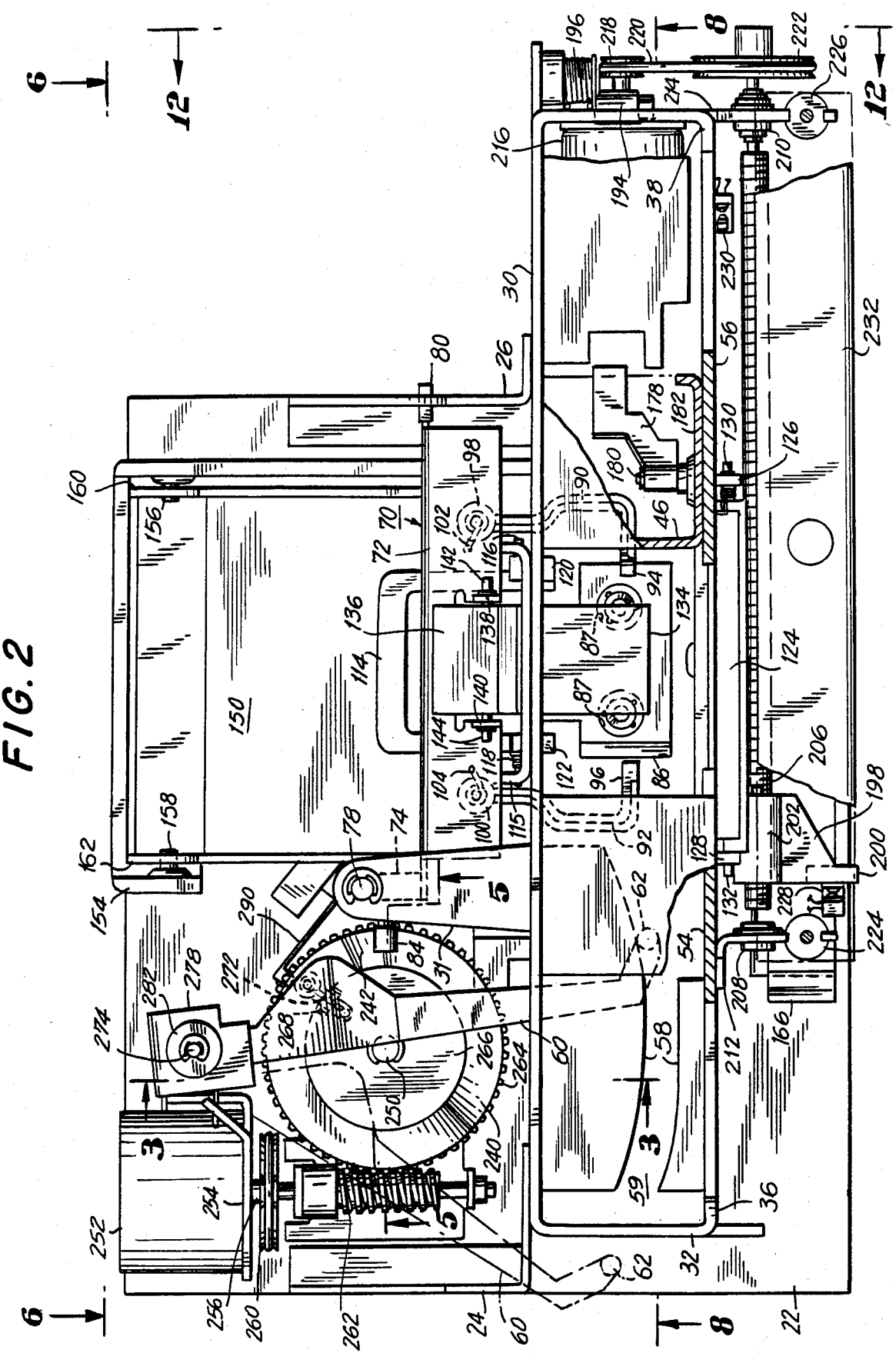
FIG. 2 is a top view taken along the line 2—2 of FIG. 1.

As best seen in FIG. 1, side wall 40 of the input hopper is provided with an exit slot 66 through which the bottommost cassette (identified as cassette $TC_{I1}$) is withdrawn from the input hopper and transported to an elevator which is disposed below output hopper 42. As mentioned above, the purpose of the elevator is to receive the cassette which is withdrawn from input hopper 28, to lower that cassette onto the recording deck for the recording of messages thereon, and then to eject that cassette from the recording deck and position it at the bottom of the stack of output cassettes $TC_O$ which are stored in output hopper 42. This reciprocating, vertical movement of the elevator is carried out by the elevator structure generally indicated in FIG. 2 by reference numeral 70.

Figure 6:
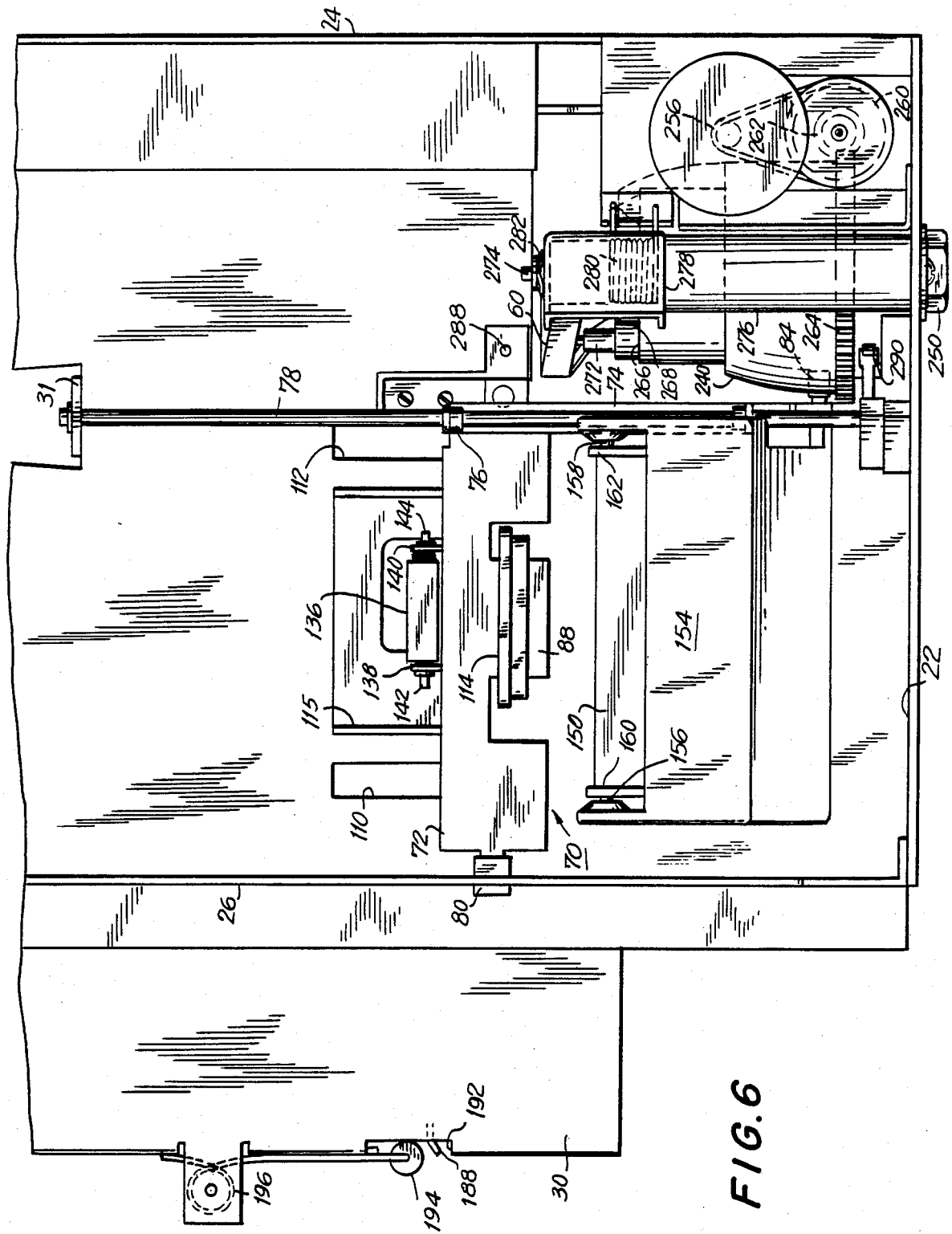
FIG. 6 is a rear view of the changer apparatus, taken along the line 6—6 of FIG. 2.
Figure 7:
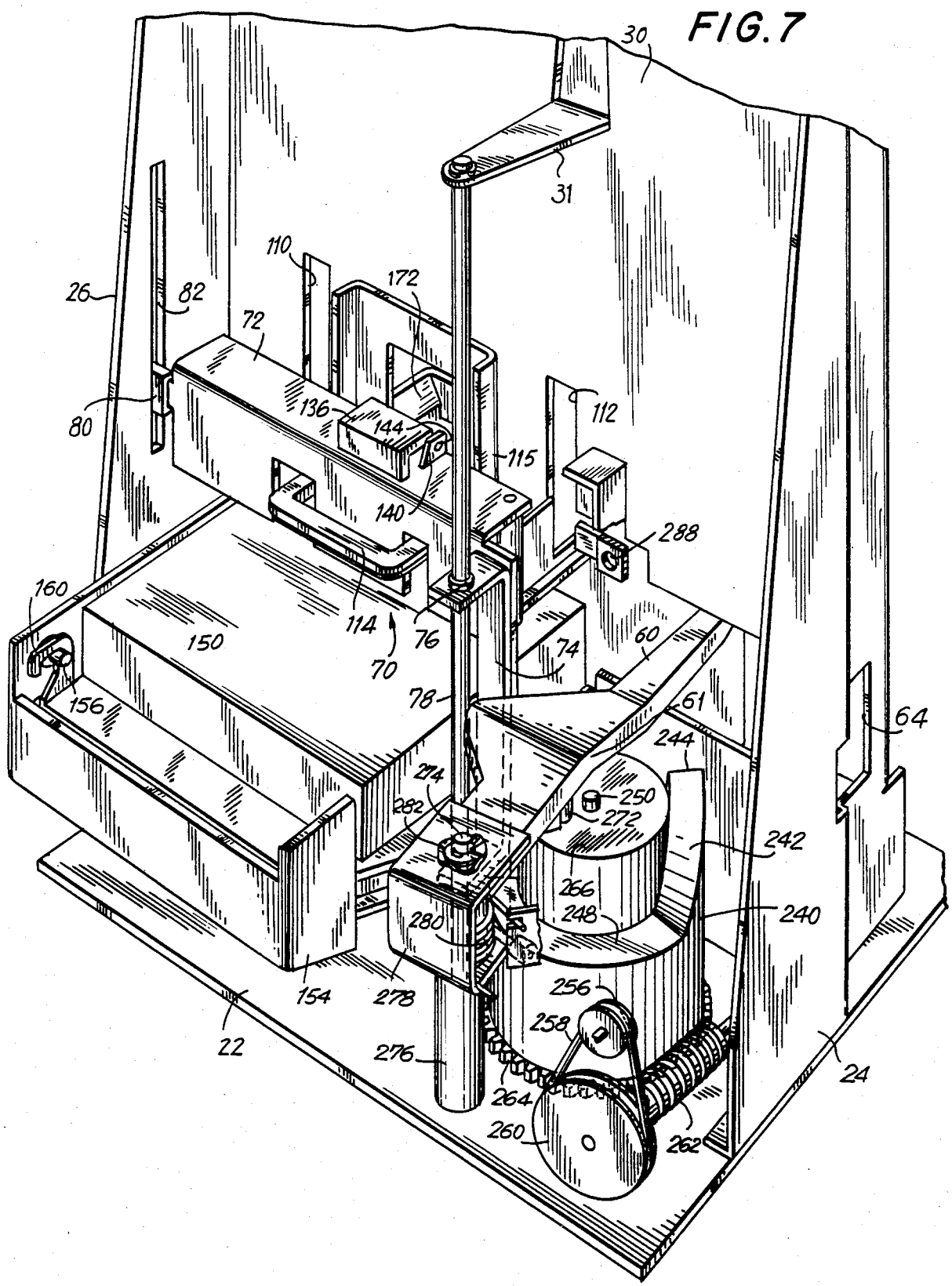
FIG. 7 is a perspective rear view of the apparatus shown in FIG. 6.

As shown in FIG. 2, and also shown in FIGS. 6 and 7, elevator 70 is comprised of a frame 72 to which an L-shaped arm 74 is coupled, this arm being provided with a bushing 76 to permit the arm and frame to slide along a guide shaft 78. This guide shaft is positioned between a rearwardly-projecting extension 31 which extends from rear panel 30 and base 22. Frame 72 also is provided with a guide tab 80 which, as shown in FIGS. 6 and 7, projects from a side edge of frame 72, this tab riding in a guide slot 82 formed in side support 26.

Figure 8:
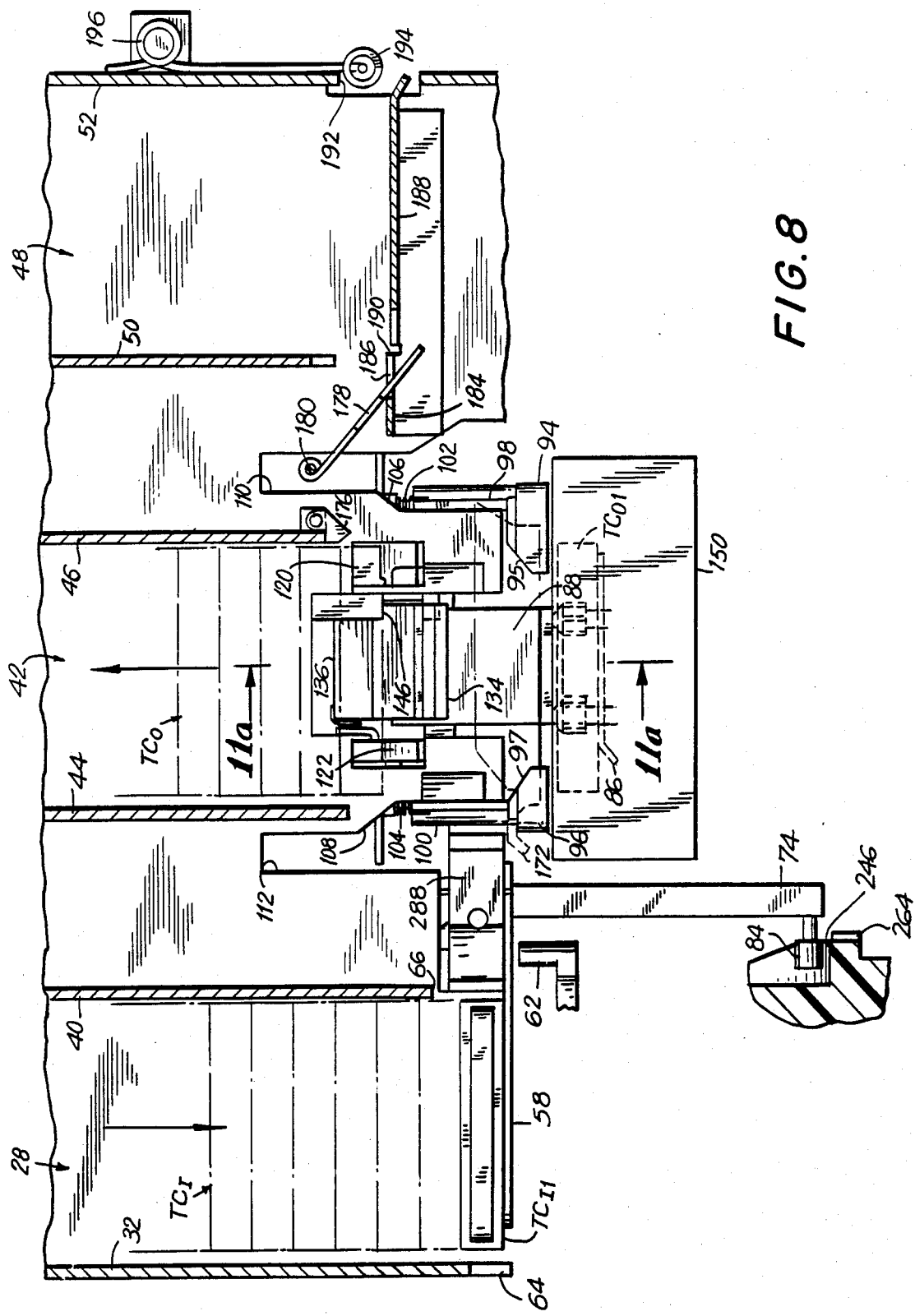
FIG. 8 is a sectional view taken along the line 8—8 of FIG. 2, illustrating the initial or "home" positions of the pusher arm and elevator used in the preferred embodiment of this invention.

As shown in FIGS. 2 and 6, and as best seen in FIG. 8, a roller 84 is mounted on L-shaped arm 74, this roller functioning as a cam follower to be described. Suffice it to say that roller 84 rides along an irregular surface 242 of a cam 240 to transfer vertical movement to elevator 70. As will be explained, when roller 84 rides along cam surface 242 to a peak thereof, elevator 70 is driven in the upward direction to deposit a cassette carried thereon to the bottom of the stack of output cassettes $TC_O$. When roller 84 rides from the peak of cam surface 242 to intermediate portion, the elevator is driven in the downward direction to a receiving location aligned with cassette support platform 58 so as to receive a cassette pushed onto the elevator by pusher arm 60. Then, when roller 84 rides along cam surface 242 from the intermediate portion to a trough, elevator 70 loads the cassette thereon into operating relation with the recording deck.

From FIGS. 2 and 8-11, it will be seen that elevator 70 is provided with cassette-receiving platform 86 that is mounted on frame 72 by means of a tongue 88. Thus, as frame 72 is driven upwardly and downwardly, tongue 88 and platform 86 likewise are driven therewith. It is appreciated that platform 86 is adapted to receive and support a cassette.

Figure 9:
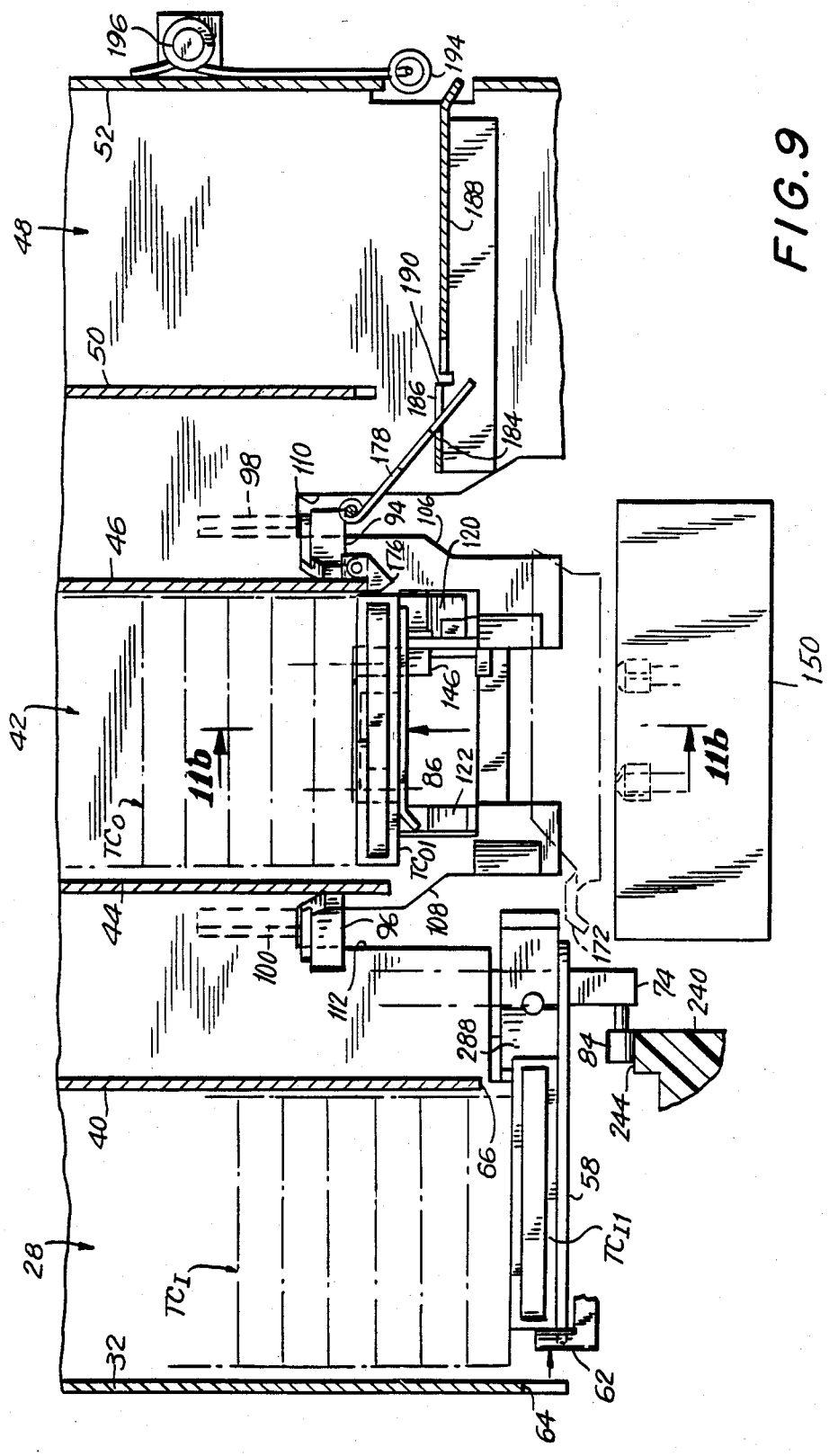
FIG. 9 is a view similar to that shown in FIG. 8 and showing the elevator in its uppermost position and the pusher arm in the position by which the bottommost cassette is in the process of being withdrawn from the input hopper of the changer apparatus.

Elevator 70 additionally includes a pair of hold-down arms 90 and 92 which, as shown in FIG. 2, are L-shaped and terminate in claw-shaped feet 94 and 96 respectively. The purpose of these hold-down arms and, particularly, claws 94 and 96, is to maintain a cassette on platform 86 when elevator 70 lowers that cassette onto the recording deck and to make sure that the cassette is seated properly on, or in good registration with, the deck during a recording or playback operation. Advantageously, claws 94 and 96 are mounted so as to pivot, or swing away, when elevator 70 rises to dispose the cassette on platform 86 at the bottom of the stack of output cassettes $TC_O$. Accordingly, hold-down arms 90 and 92 extend from pivotable posts 98 and 100, respectively, these posts being pivotally coupled to frame 72, as shown in FIG. 2. Advantageously, spring elements 102 and 104 bias posts 98 and 100 to urge hold-down arms 90 and 92 to the position shown in FIG. 2. As best illustrated in FIG. 8, claws 94 and 96 are provided with inclined surfaces 95 and 97, respectively, these surfaces being provided generally on the top of the claws. Inclined surfaces 95 and 97 are adapted to contact cam surfaces 106 and 108, respectively, of a vertical wall in the output hopper, the inclined surfaces of the claws being brought into contact with the cam surfaces of the vertical wall when elevator 70 is raised. It is recognized that the forces exerted on claws 94 and 96 when their inclined surfaces contact cam surfaces 106 and 108 serve to pivot posts 98 and 100 so as to move the hold-down arms to noninterfering positions. This, in turn, permits the cassette supported on platform 86 to be raised to the bottom of the stack of output cassettes TC$_O$ in output hopper 42. As best shown in FIG. 8, the aforementioned vertical wall on which cam surfaces 106 and 108 are disposed is provided with guide slots 110 and 112 to accommodate claws 94 and 96 when the hold-down arms pivot to the aforementioned noninterfering position. The accommodation of claws 94 and 96 within guide slots 110 and 112 is best seen in FIG. 9.

Elevator 70 also includes a blocking member 134 (partially shown in FIG. 1 and shown more clearly in FIG. 11) which is disposed below the output stack of cassettes TC$_O$ and functions to prevent inadvertent dislocation of a cassette, such as the bottommost cassette in output hopper 42, to interfere with elevator platform 86 or with a cassette that already is supported on that platform. As will be described, the recording deck is disposed beneath and aligned with output hopper 42, and blocking member 134 prevents a cassette from dropping down into interference with the recording deck.

As best seen in FIG. 11, and also shown in FIGS. 2, 6 and 7, blocking member 134 is formed with a finger-like stop member 136, the stop member and blocking member preferably being of unitary construction. Stop member 136 is pivotally coupled to frame 72 of elevator 70. More particularly, frame 72 is provided with a pair of upstanding ears 138 and 140; and stop member 136 is provided with pivot stubs 142 and 144 which are pivotally coupled to ears 138 and 140, respectively. Thus, blocking member 134 is seen to be pivotally coupled to ears 138 and 140 and, thereby, the blocking member is pivotally coupled to elevator frame 72. The stop member limits the counterclockwise rotation of blocking member 134, which rotation is urged by spring 141.

Rear panel 30 is provided with a depending contact member 146, best shown in FIGS. 8-11. It is appreciated that, when elevator 70 is driven in the upward direction, this depending contact member 146 is disposed to intercept blocking member 134. As a result of this interception, a force is exerted in the downward direction on blocking member 134 by contact member 146. Consequently, the blocking member pivots in the downward direction (shown in FIG. 11B) as elevator frame 72 rises. In this manner, the blocking member is pivoted out of its blocking configuration to permit the cassette supported on platform 86 to be raised into the bottom of output hopper 42.

The stack of output cassettes TC$_O$ is supported in output hopper 42 by means of a pair of rear latches 120 and 122 and a front latch 124. As used herein, the designation "rear" refers to those elements aligned with or operable on the rear wall of a cassette, this rear wall being adjacent rear panel 30; and the designation "front" refers to those elements which contact or cooperate with the front wall of the cassette. Thus, rear latches 120 and 122 are adapted to support the bottommost cassette in output hopper 42 in the vicinity of the rear wall thereof, and front latch 124 is adapted to support this cassette in the vicinity of its front wall. In the embodiment described herein, rear latches 120 and 122 are adapted to support the rear corners of the bottom wall of a cassette, and front latch 124 is adapted to support the bottom wall of a cassette along the front edge thereof. As shown in FIGS. 2 and 6-11, rear latches 120 and 122 constitute the respective free ends of U-shaped yoke 114, this yoke being pivotally coupled to a frame 115 which is mounted on the rear surface of rear panel 30 (FIGS. 2 and 7). As shown in FIGS. 2 and 11, yoke 114 is provided with pivot couplings 116 and 118 by which the yoke is pivotally coupled to frame 115. Preferably, one or both of pivot couplings 116 and 118 is provided with a spring bias to maintain the yoke and rear latches 120 and 122 in the supporting configuration illustrated in FIGS. 1, 2 and 11A.

Front latch 124 is pivotally coupled to ears 126 and 128 which extend outwardly from front panels 56 and 54, respectively, as shown in FIGS. 1 and 2. The front latch is provided with stubs 130 and 132, which are pivotally supported in ears 126 and 128, respectively, as shown in FIGS. 1 and 2. Preferably, one or both of these pivot couplings is provided with a spring bias to urge front latch 124 to the configuration illustrated in FIGS. 1, 2 and 11A.

As will be described in greater detail below, when elevator 70 raises a cassette from the recording deck to output hopper 42, the front and rear edges of the top wall of this cassette engage the illustrated inclined surfaces of front latch 124 and rear latches 120 and 122 so as to pivot these latches in a direction to overcome the spring bias thereon, as shown by the broken lines in FIG. 11B. In this manner, the latches pivot out of interference with the cassette being raised to the bottom of output hopper 42. After this cassette has been raised sufficiently to clear latches 120, 122 and 124, the spring bias forces exerted thereon tend to return those latches to the configuration best seen in FIGS. 11A and 11C, whereby the latches are positioned to support the bottommost cassette in the output stack TC$_O$. Hence, the output stack of cassettes TC$_O$ is supported in output hopper 42 by latches 120, 122 and 124.

As mentioned before, the recording deck, referred to herein as a record/playback deck, is disposed beneath output hopper 42 and is adapted to record and/or play back messages on a cassette which is "loaded" thereon. The record/playback deck, referred to generally by reference numeral 150, may include the usual drive and spindles, capstan, pinch roller, record/playback head, and erase head normally provided on conventional recording apparatus. It is appreciated that, when the record/playback deck is used to record messages on, for example, minicassettes, the capstan and pinch roller can be omitted. Stated generally, the record/playback deck is provided with conventional means to transport the magnetic medium (i.e., the magnetic tape) and record or play back information thereon.

Record/playback deck 150 is supported on deck support plate 152 (FIGS. 1, 12 and 18), this support plate being supported, in turn, by a deck support frame 154. Preferably, the deck support frame is formed of resilient material, such as ABS, the rear portion thereof being provided with a pair of bosses 156 and 158 (FIGS. 2, 6 and 7) for supporting hangers 160 and 162 (FIGS. 2, 6, 7 and 18) which extend upwardly from the rear of deck support plate 152. It is seen that the rear portion of record/playback deck 150 is pivotally coupled to deck support frame 154 by way of the cooperation between hangers 160 and 162, and the bosses 156 and 158, respectively. The front portion of deck support frame 154 is provided with a pair of flexible upstanding ears 164 and 166 (FIGS. 1 and 18) that include slots 168 and 170, respectively, to receive and support the front portion of deck support plate 152. As will be explained, in order to gain access to record/playback deck 150 for minor repairs or maintenance or to clear a tape jam, ears 164 and 166 may be manually shifted in respectively outward directions, such as shown in FIG. 18, thereby releasing the front portion of deck support plate 152 and permitting record/playback deck 150 to pivot relative to frame 154 in a downward direction. Hangers 160 and 162 then may be removed from bosses 156 and 158 to withdraw deck 150 from the frame and permit the deck to be repaired or serviced.

The foregoing has described generally the structure of the cassette changer apparatus by which the bottommost cassette in input hopper 28 is withdrawn therefrom, transported to platform 86 of elevator 70 for lowering onto record/playback deck 150 for recording of messages, and then, after the recording operation has been completed, elevator 70 raises this cassette to the bottom of output hopper 42 and returns platform 86 to a position for receiving a fresh cassette. As mentioned above, it is one feature of the present invention to discharge from output hopper 42 a cassette which has been designated a "priority" cassette. Such priority discharge apparatus is comprised of a priority eject finger 198 (FIGS. 2 and 14–17), a lead screw 206 and a pivotable flapper 178 (FIGS. 2, 8–10 and 14–17) disposed in the vicinity of priority hopper 148. Priority eject finger 198 is provided with a leg 200 and is secured to a lead screw follower 202. Advantageously, leg 200 and lead screw follower 202 are of unitary construction. A bias spring 204 disposed within the bore of lead-screw follower 202 serves to bias this follower to lead screw 206. As will be described below, as a result of this biasing, priority eject finger 198 tends to rotate with the rotation of lead screw 206. That is, if the lead screw rotates in a clockwise direction, eject finger 198 likewise rotates in this clockwise direction so as to rotate leg 200. Conversely, if lead screw 206 rotates in the counterclockwise direction, eject finger 198 likewise rotates in the counterclockwise direction to rotate leg 200.

The opposite ends of lead screw 206 are disposed in bushings 208 and 210 (FIG. 2) which, in turn, are supported in lead screw support brackets 212 and 214 secured to front panel 54 and to leg 34, respectively. A priority drive motor 216 has its drive shaft coupled to a pulley 218 which is entrained by a drive belt 220 with a lead screw pulley 222. As shown in FIGS. 2 and 12, lead screw pulley 222 is coupled to one end, for example, the rightmost end, of lead screw 206 to rotate the lead screw in a direction determined by the direction of rotation of drive motor 216. A pair of stop members 224 and 226 are disposed in the vicinity of the opposite ends of lead screw 206 and serve to prevent over-travel of eject finger 198 in the event that priority drive motor 216 fails to be de-energized as will be described. Motor switches 228 and 230 also are disposed in the vicinity of the opposite ends of lead screw 206 and are adapted to be contacted by eject finger 198 when this finger has been driven to its leftmost, or start (or standby), position, and to its rightmost, or limit position, respectively.

As shown in FIGS. 1 and 2, a shield 232 overlies lead screw 206, this shield being provided with an elongated slit 234 therein. Slit 234 has a vertical notch 236 at the left end thereof and an enlarged notch 238 at the right end thereof. As can be seen from FIG. 13, eject finger 198 is provided with a heel 201 which projects outwardly from elongated slit 234. When the eject finger is disposed at its start, or standby, position (FIG. 2), heel 201 is aligned with vertical notch 236. Hence, when lead screw 206 rotates in the clockwise direction, eject finger 198 likewise rotates (because of biasing exerted by spring 204) and heel 201 passes through vertical notch 236 to permit the eject finger to rotate to the position represented by broken lines in FIG. 13. In this configuration, leg 200 is adapted to contact the left side wall of the bottommost cassette in output hopper 42. As lead screw 206 continues to rotate, the bottom edge of front panel 54 (FIG. 13) prevents further rotation of eject finger 198, thereby permitting lead-screw follower 202 to "follow" the rotation of the lead screw. As a consequence, the cassette which is contacted by leg 200 is discharged from output hopper 42 and is driven into priority hopper 148.

As will be described in greater detail below, this "priority" cassette remains within the priority hopper when priority drive motor 216 is reversed to drive lead screw 206 in the opposite direction. The reversal of the priority drive motor is triggered when eject finger 198 reaches its limit position and contacts limit switch 230 to cause the energization of the priority drive motor to reverse. When at its limit position, eject finger 198 is in the vicinity of enlarged notch 238; and the eject finger rotates with the rotation of lead screw 206 (again, because of the biasing exerted by spring 204) to position heel 201 against the upper edge of elongated slot 234. Further rotation of eject finger 198 thus is prevented; and lead-screw follower 202 now "follows" the counterclockwise rotation of lead screw 206 to drive the eject finger back to its starting or standby position. It is appreciated that shield 232 thus functions to limit the rotation of eject finger 198 with the rotation of lead screw 206 so as to permit the eject finger to be properly positioned as it is driven along the lead screw.

Pusher Arm Assembly

As best shown in FIGS. 2, 3, 4 and 7, pusher arm 60 is angled at 61 and has one end thereof pivotally coupled to pivot axis 274. Finger 62 is disposed in upstanding relationship at the free end of pusher arm 60. Pivot axis 274 is coupled to pivot post 276 secured to base 22 of the changer apparatus. A supporting frame 278 is mounted on the upper end of pivot post 276 and supports a spring 280 therein, this spring serving to bias pusher arm 60. In addition, a spring lock washer 282 secures frame 278 to the top of support post 276 and also serves to bias pusher arm 60 in the downward direction.

As viewed from the bottom (FIG. 4), a groove 284 is provided in the bottom surface of pusher arm 60. This groove exhibits a relatively deep section 286 and is adapted to entrain a connecting pin 270 by which the pusher arm is mechanically coupled to rotary cam 240.

Figure 3:
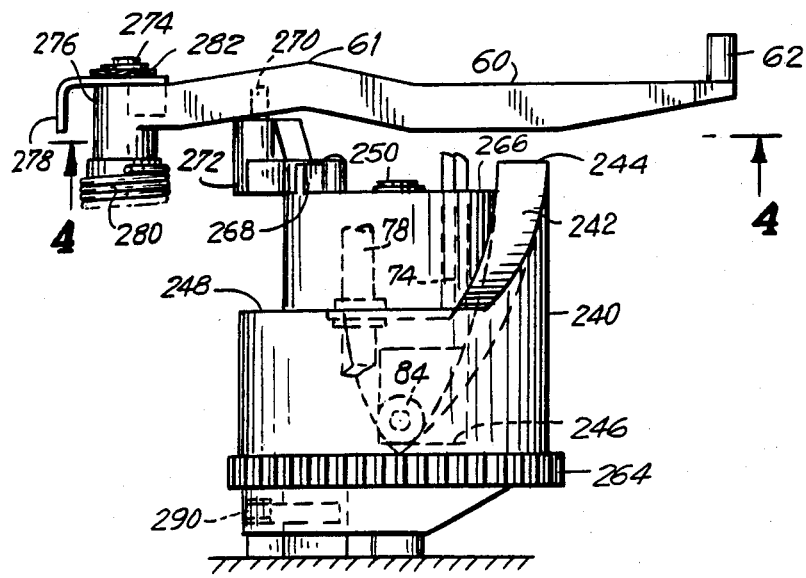
FIG. 3 is a sectional view of the withdrawing element used with this invention taken along the line 3—3 of FIG. 2.
Figure 5:
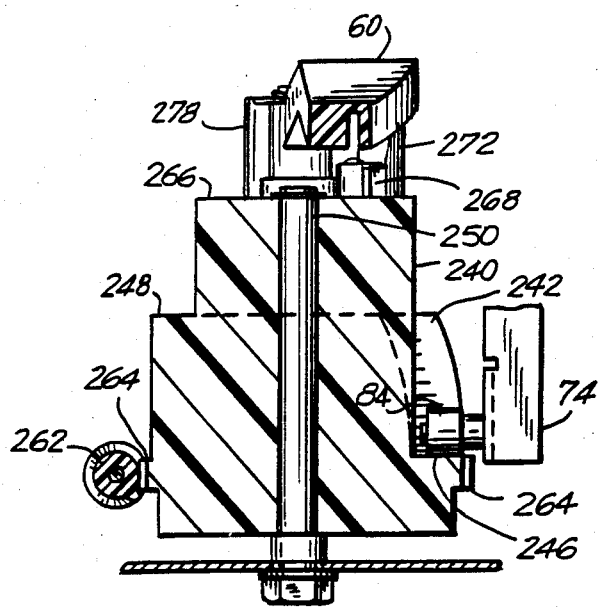
FIG. 5 is a sectional view taken along the line 5—5 in FIG. 2.

As shown in FIGS. 2, 3, 5 and 7, cam 240 is provided with an irregular cam surface 242 on which rides cam follower roller 84 of elevator 70, as will be described. Cam 240 is rotatably driven about rotary axis 250, this axis being, for example, a shaft fixed to base 22 as shown in FIGS. 3, 5 and 6. A cam drive motor 252 is secured to base 22 via a motor mount 254, the motor having a drive shaft coupled to a pulley 256, as shown in FIGS. 2, 6 and 7. Pulley 256 is, in turn, coupled to a worm drive pulley 260 by a drive belt 258. The worm drive pulley is coupled to a worm gear 262 such that when cam drive motor 252 is energized, worm gear 262 is driven. The teeth of worm gear 262 are seen to engage gear teeth 264 provided on the circumference of the lower portion of cam 240. Thus, the energization of cam drive motor 252 results in the rotation of cam 240. For the purposes of the present invention, it will be assumed that cam 240 rotates in the counterclockwise direction, as viewed in FIG. 2.

Cam 240 is provided with a top surface 266 (FIGS. 2 and 5) on which is supported a support mounting 268. This support mounting serves to support a pin assembly 272 which terminates in connecting pin 270. As mentioned above and as shown in FIGS. 3 and 4, the connecting pin is entrained by and rotates in groove 284 on the under surface of pusher arm 60.

A cam drive motor switch 290 is disposed adjacent the bottom portion of cam 240, this switch having a pair of contacts which are closed (or opened) when contacted by a protuberance on the cylindrical wall of the cam. The closing (or opening) of the contacts of switch 290 deenergizes cam drive motor 252 to terminate the rotation of cam 240.

Figure 4:
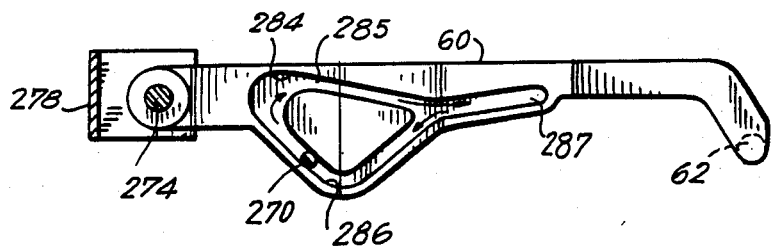
FIG. 4 is a bottom view of the pusher arm used as the withdrawing element taken along the line 4—4 of FIG. 3.

Let it be assumed that pin 270 rides in groove 284 in the direction indicated by the arrows of FIG. 4. When pin 270 is in the position shown by the solid lines in FIG. 4 (which corresponds to the position shown in FIG. 2), pusher arm 60 is driven from right to left toward the position represented by the broken lines in FIG. 2. For convenience, this position (i.e., the position represented by the broken lines) is designated the "engaged" position. The position of pusher arm 60 represented by the solid lines in FIG. 2 is designated the "home" position. From the home position to the engaged position, the pin rides in the deeper portion 286 of the groove 284; and the downward spring bias exerted on the pusher arm here serves to dispose finger 62 below cassette support platform 58. This is shown more particularly in FIG. 8. Further rotation of cam 240 positions pin 270 at a relatively shallow portion 285 of groove 284. This, in turn, tends to raise, or elevate, pusher arm 60 so as to dispose finger 62 in position to contact the left side wall of the bottommost cassette in input hopper 28, as shown in FIG. 9. Continued rotation of cam 240 drives pin 270 in groove 284 to location 287 therein, this location serving to pivot pusher arm 60 to its extreme location, shown in FIG. 10. As cam 240 continues to rotate, pin 270 rides from position 287 through the deeper portion of groove 286 so as to lower the pusher arm, thus returning it to the home position shown in FIG. 8; and then bringing the pusher arm back to the engaged position represented by the broken lines in FIG. 2.

Figure 10:
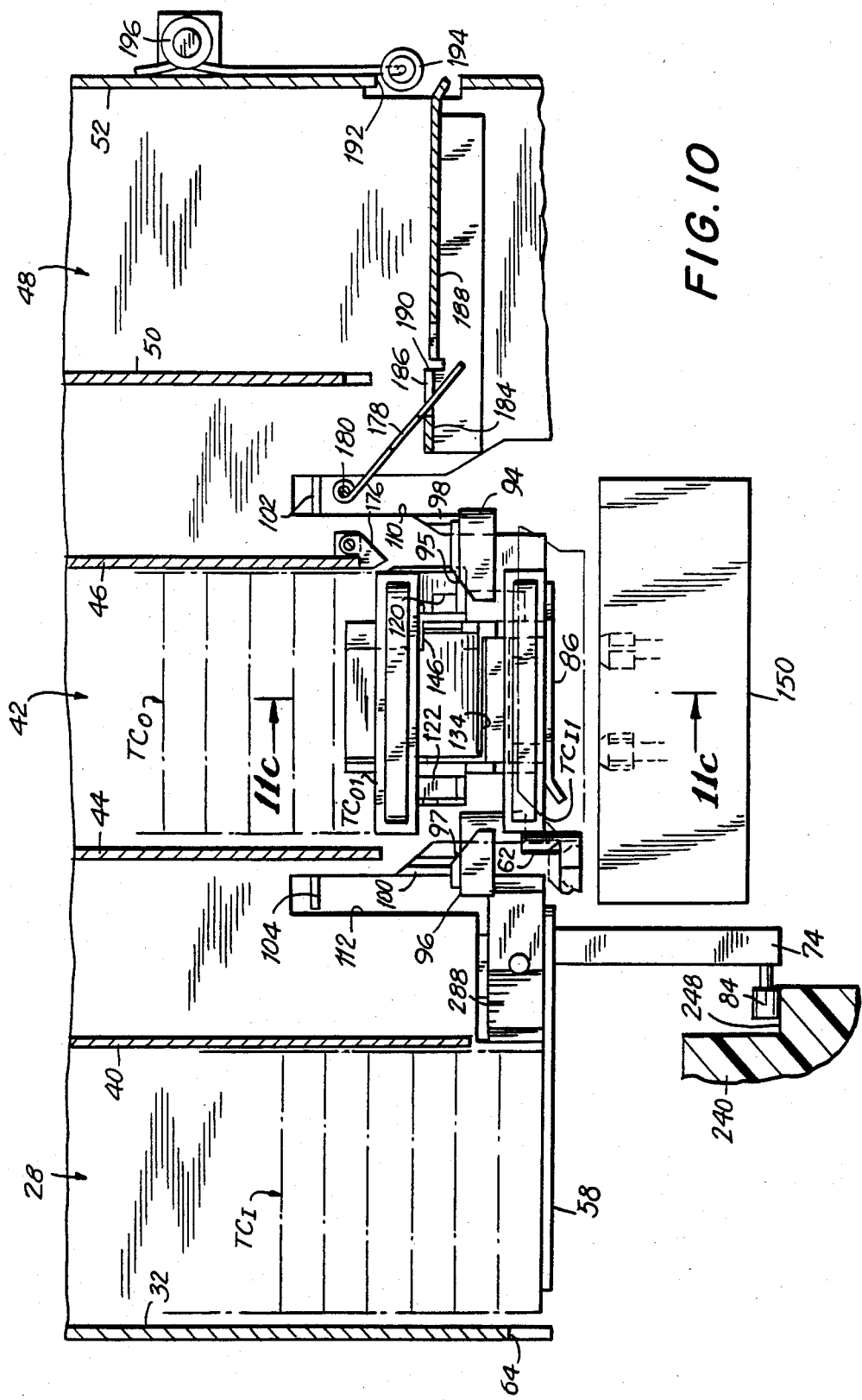
FIG. 10 is a view similar to that shown in FIG. 8, showing the elevator in its intermediate position for receiving the cassette that has been withdrawn by the pusher arm from the input hopper.

Thus, it is seen that, as cam 240 undergoes one complete rotation, pusher arm 60 is driven from its home position (FIG. 8) to its engaged position whereat the pusher arm rises to engage finger 62 with the bottommost cassette in input hopper 28 and drive that cassette toward platform 86 of elevator 70 (FIG. 10). Hence, pusher arm 60 not only undergoes reciprocating motion in the left-right direction (FIGS. 2 and 8-10), but also undergoes vertical movement permitting finger 62 to be withdrawn toward the engaged position (FIG. 9) while passing under the stack of input cassettes $TC_I$. It is recognized that the pusher arm drives the bottommost cassette $TC_{I1}$ while moving in one horizontal plane, and then returns in a lower horizontal plane to engage the next cassette in the input hopper.

Elevator Drive

In addition to the reciprocating movement of pusher arm 60 caused by the rotation of cam 240, the cam also functions to drive elevator 70 in the vertical direction. As mentioned above, roller 84, which extends from L-shaped arm 74 of elevator 70, rides on cam surface 242. As can be seen from FIGS. 3, 5 and 7, cam surface 242 is provided with a peak 244, a trough 246 and an intermediate portion 248. When roller 84 rides from trough 246 to peak 244, elevator 270 rises to lift platform 86 thereof, thereby bringing the cassette then disposed on this platform from record/playback deck 150 to the bottom of the stack of output cassettes $TC_O$. As cam 240 continues to rotate, roller 84 rides from peak 244 to intermediate portion 248, thereby lowering platform 86 into position to receive a fresh cassette that is driven thereto from input hopper 28 by pusher arm 60. It is seen that intermediate portion 248 is of sufficient circumferential extent to maintain the platform in position to receive a fresh cassette for as long as is necessary for pusher arm 60 to withdraw that cassette from the input hopper. Thereafter, roller 84 rides from intermediate portion 248 to trough 246 so as to lower platform 86 and bring the cassette thereon onto record/playback deck 150. A cassette guide 176, which may be shaped generally as a tapered guide, is shown by broken lines in FIGS. 8-10 and is disposed above record/playback deck 150 to guide a cassette lowered by platform 86 into proper alignment with the deck.

The manner in which the movement of pusher arm 60 and the movement of elevator 70 are coordinated now will be described with reference to FIGS. 8-10 and 11A-11 C. Let it be assumed that cam 240 has rotated such that roller 84 has ridden to trough 246 while pin 270 is at the location shown in FIG. 4. It is recalled that this position of the cam, pusher arm and elevator is designated the "home" position, and is shown in FIG. 8. Here, finger 62 has been lowered below cassette support platform 58, thereby permitting the return of the pusher arm to its engaged position without interfering with the cassettes stacked within input hopper 28. Furthermore, since roller 84 is disposed upon trough 246 of cam surface 242, elevator 70 is at its lowermost position, whereupon platform 86 has lowered the cassette supported thereon onto record/playback deck 150. In order to facilitate a ready understanding of the coordinated operation between pusher arm 60 and elevator 70, it is assumed herein that the cassette now loaded on platform 86 is designated $TC_{O1}$ and the bottommost cassette next to be withdrawn from input hopper 28 is designated $TC_{I1}$.

From FIG. 8, it is seen that hold-down arms 90 and 92 are in position to maintain cassette $TC_{O1}$ on platform 86 and, in fact, these hold-down arms have functioned to ensure that this cassette has been loaded and properly maintained on the record/playback deck for a recording or playback operation.

It is assumed that cam drive motor 252 is de-energized when pusher arm 60 and elevator 70 are in the position illustrated in FIG. 8. Let it now be assumed that a cassette-change operation is to be carried out. Accordingly, cam drive motor 252 is energized to commence the rotation of cam 240. As the cam rotates, pin 270 rides within groove 284 in the direction indicated by the arrows of FIG. 4. Thus, as the cam rotates, pin 270 drives pusher arm 60 to pivot in the clockwise direction about pivot axis 274. The pin now rides in the relatively deeper portion 286 of groove 284, thereby maintaining finger 62 below cassette support platform 58 as the pusher arm is driven to its engaged position shown in FIG. 9.

As cam 240 rotates, roller 84 rides from trough 246 to peak 244 of cam surface 242, as shown in FIG. 9. Thus, as pusher arm 60 is driven to its engaged position, elevator 70 is driven in the upward direction. Hence, elevator platform 86 raises cassette $TC_{O1}$ thereon to the bottom of the stack of output cassettes $TC_{O1}$. It is recalled that, as elevator 70 is raised, pivotable posts 98 and 100 of hold-down arms 90 and 92 pivot in the outward direction as a result of the contact between cam surfaces 106 and 108 and inclined surfaces 95 and 97 of claws 94 and 96, respectively. As shown in FIG. 9, hold-down arms 90 and 92, when pivoted in this manner, thus slide within guide slots 110 and 112. That is, the hold-down arms pivot out of interference with cassette $TC_{O1}$, thereby permitting this cassette to be positioned at the bottom of the stack of cassettes in output hopper 42.

As shown in FIG. 11B, when platform 86 rises, the top wall of cassette $TC_{O1}$ engages the inclined surfaces of rear latches 120 and 122 and the inclined surface of front latch 124. Further upward movement of elevator platform 86 tends to rotate these latches as represented by the broken lines in FIG. 11B. Thus, the support surfaces of these latches are pivoted away to permit cassette $TC_{O1}$ to be driven above and clear of these front and rear latches. It is appreciated that, as platform 86 is driven to the position shown in FIG. 11B, the stack of output cassettes $TC_O$ is raised as a result of the force exerted thereon by upwardly driven cassette $TC_{O1}$.

As shown in FIG. 9, finger 62 engages bottommost cassette $TC_{I1}$ in input hopper 28 to withdraw that cassette from the stack of input cassettes $TC_I$. FIG. 9 illustrates a partial withdrawal of this cassette $TC_{I1}$. As cam 240 continues to rotate, pusher arm 60 is driven further toward the right (FIG. 9), and roller 84 now rides from peak 244 of cam surface 242 toward intermediate portion 248 thereof. Consequently, elevator 70 now is driven in the downward direction. As platform 86 is lowered, cassette $TC_{O1}$ thereon, together with the stack of cassettes $TC_O$ thereabove, likewise is lowered. However, since rear latches 120 and 122 and front latch 124 have returned to the positions represented by the solid lines in FIG. 11B, they restrain and support the bottom wall of cassette $TC_{O1}$ as this cassette lowers into contact with the support surfaces of these latches. From FIG. 2, it is seen that the dimension of platform 86 is such that it does not interfere with or contact any of the rear or front latches. Rather, these latches merely contact and restrain cassette $TC_{O1}$ as the output stack of cassettes $TC_O$ is lowered thereon.

Further rotation of cam 240 continues to drive pusher arm 60 to its extreme cassette-withdrawal position shown in FIG. 10. At the same time, roller 84 rides from peak 244 to intermediate portion 248 of cam surface 242, thereby lowering platform 86 to the plane in which cassette support platform 58 is disposed. Hence, finger 62 is able to push the withdrawn cassette $TC_{I1}$ onto platform 86, as shown in FIGS. 10 and 11C. As cam 240 continues to rotate, roller 84 rides from intermediate portion 248 to trough 246 of cam surface 242, thereby lowering cassette $TC_{I1}$ onto record/playback deck 150 to have messages recorded thereon. At the same time, pusher arm 60 is lowered and returned to the home position shown in FIG. 8. This completes one full rotation of cam 240, whereupon cam drive motor switch 290 is actuated to de-energize cam drive motor 252. Hence, elevator 70 remains at its lowermost position and pusher arm 60 remains at its home position until the cam drive motor is actuated subsequently.

FIG. 10 also illustrates previously ejected cassette $TC_{O1}$ at the bottom of output hopper 42, this cassette being supported by rear latches 120 and 122 and by front latch 124.

As can be seen from FIGS. 6–10, an optical reader 288, such as a bar code reader, is disposed adjacent the transport path followed by cassette $TC_{I1}$ as it is withdrawn from input hopper 28 and loaded onto platform 86. As best seen in FIG. 7, optical reader 288 is coupled to rear panel 30 and functions to sense, or "read," an identifying bar code that made be provided on the rear wall of each cassette. Thus, the identity of each cassette that is withdrawn from input hopper 28 and loaded onto record/playback deck 150 is read by optical reader 288. This identifying data is used for a purpose described below.

Though not specifically mentioned above, it will be appreciated that, when the bottommost cassette $TC_{I1}$ is withdrawn from input hopper 28, the stack of cassettes thereabove drops down to fill the space vacated by that cassette $TC_{I1}$.

As shown in FIGS. 11A–11C, blocking member 134 pivots to a noninterfering position, shown particularly in FIG. 11B, when elevator 70 is raised. As mentioned above, contact member 146, which depends from a vertical wall, contacts blocking member 134 to cause the blocking member to pivot about pivot stubs 142 and 144 as frame 72 rises. In this manner, blocking member 134 is pivoted away from interfering with the positioning of used cassette $TC_{O1}$ at the bottom of the stack of cassettes in output hopper 42.

Priority Discharge

As mentioned above, the priority discharge apparatus comprised primarily of lead screw 206 and priority eject finger 198 is driven by priority drive motor 216. This priority drive motor is seen to be independent of cam drive motor 252 and suitable electronics (not shown) may be provided to selectively energize the priority drive motor. If a cassette upon which messages are recorded is designated a priority cassette, the aforementioned electronics serves to energize priority drive motor 216 after that priority cassette has been ejected from record/playback deck 150 to output hopper 42. For example, after cam 240 has completed one full rotation and cam drive motor switch 290 has been closed (or opened), an indication thereof may be supplied to the aforementioned electronics whereupon priority drive motor 216 is energized.

Initially, priority eject finger 198 exhibits the standby position illustrated by solid lines in FIG. 13. In particular, heel 201 of leg 200 is disposed within vertical notch 236 illustrated at the left end of elongated slit 234 in shield 232 (FIG. 1).

Upon energization thereof, priority drive motor 216 rotates lead screw 206 in the clockwise direction. As a result, lead-screw follower 202 of eject finger 198 also rotates in the clockwise direction due to the spring bias force which urges bias spring 204 within the bore of the lead-screw follower against the lead screw. Accordingly, eject finger 198 rotates in the clockwise direction, and heel 201 thereof is rotatably withdrawn from vertical notch 236. The eject finger thus exhibits the position represented by the broken lines in FIG. 13. In this position, leg 200 contacts the left side wall of cassette $TC_{O1}$, the bottommost cassette in output hopper 42. This contact of leg 200 with cassette $TC_{O1}$ is illustrated more particularly in FIG. 14.

As lead screw 206 continues to rotate, further rotation of eject finger 198 is inhibited by the contact between the lower edge of front panel 54 with eject finger 198, as shown in FIG. 13. Thus restrained from further rotation, lead-screw follower 202, and thus, eject finger 198, is driven by the rotation of the lead screw in the direction of the arrow shown in FIG. 14. Hence, bottommost cassette $TC_{O1}$ is discharged from output hopper 42 to a priority hopper 48. As eject finger 198 is driven, the contacts of limit switch 228 are permitted to open.

As cassette $TC_{O1}$ is discharged by eject finger 198, the leading edge of this cassette contacts pivotable flapper 178. As shown in FIGS. 2 and 15, flapper 178 is coupled by pivot coupling 180 to a mounting support 182 which, as shown in FIG. 2, is integral with side wall 46. The free end of flapper 178 normally is disposed within aperture 186 of discharge platform 184. However, as cassette $TC_{O1}$ passes through entry slot 68 of side wall 46, it contacts flapper 178 to pivot that flapper in the counterclockwise direction about pivot coupling 180, as shown in FIG. 15. In the event that other cassettes are supported on priority hopper platform 188 at the bottom of priority hopper 48, this pivoting of flapper 178 serves to raise the left side of such cassettes to allow the leading edge of cassette $TC_{O1}$ to pass thereunder. Further rotation of lead screw 206 drives cassette $TC_{O1}$ fully onto priority hopper platform 188 and beneath the stack of cassettes that may be stored in the priority hopper.

As shown in FIG. 16, eject finger 198 serves to fully discharge cassette $TC_{O1}$ beyond discharge platform 184 and through an overshoot slot 192 provided in side wall 52. A spring-biased return finger 194 is disposed in overshoot slot 192, this finger being coupled to a spring 196 which, as shown in FIG. 12, is mounted on the outside surface of side wall 52. The spring bias force exerted on return finger 194 by spring 196 is overcome by the driving force exerted on cassette $TC_{O1}$ by eject finger 198.

Lead screw 206 continues to rotate to drive eject finger 198 until the eject finger closes the contacts of limit switch 230. As shown in FIG. 16, the contacts of the limit switch are closed by the engagement thereagainst of, for example, lead-screw follower 202. It will be appreciated that the contacts of limit switch 230 are closed when eject finger 198 has driven cassette $TC_{O1}$ sufficiently to pass beyond the free end of flapper 178, thereby permitting the flapper to return to its normal position illustrated in FIG. 17.

The priority discharge control electronics (not shown) is responsive to the closure of the contacts of limit switch 230 to reverse the energization of priority drive motor 216. As a result of this reversal, lead screw 206 is driven in a counterclockwise direction, and lead-screw follower 202, which is spring-biased toward the lead screw, rotates with the lead screw to rotate eject finger 198 such that heel 201 thereof extends through enlarged notch 238. Further rotation of the eject finger is inhibited when heel 201 contacts the upper edge of elongated slit 234 in shield 232.

Now, as lead screw 206 continues to rotate in the counterclockwise direction, lead-screw follower 202 is driven back to its standby position, that is, toward limit switch 228. Cassette $TC_{O1}$ is driven by biased return finger 194 to move in the direction indicated by the arrow of FIG. 17. It is seen that a step 190 is provided between the discharge platform 184 and priority hopper platform 188 to restrain further leftward movement of cassette $TC_{O1}$. This step serves to register cassette $TC_{O1}$ in priority hopper 48.

Eject finger 198 now may be driven until it closes the contacts of limit switch 228, whereupon the priority control electronics de-energizes priority drive motor 216. The priority discharge apparatus now is in condition to discharge the next "priority" cassette that may be ejected to output hopper 42 in the manner described above.

Deck Support Apparatus

As best seen in FIGS. 6, 7 and 18, record/playback deck 150 is supported on a deck support plate 152 which, in turn, is supported on deck support frame 154, the latter preferably being formed of resilient material, such as plastic, ABS, or the like. The rear end of frame 154 is provided with a pair of bosses 156 and 158 for supporting anchors 160 and 162 which are mounted on the rear portion of deck support plate 152. Thus, the rear portion of the record/playback deck is pivotally supported on frame 154.

The front portion of frame 154 terminates in a pair of upstanding ears 164 and 166 which are provided with slots 168 and 170 therein, respectively. These slots receive the front portion of deck support plate 152 to support the front portion of record/playback deck 150. As depicted in FIG. 18, ears 164 and 166 may be manually spread apart to release support plate 152, thereby permitting the record/playback deck to be dropped down, as illustrated. Generally, this dropping down of the record/playback deck permits access to a cassette which may be jammed therein or permits a user to carry out relatively simple maintenance and repair of the deck. In the event that more substantial servicing of the deck is needed, hangers 160 and 162 may be lifted from bosses 156 and 158 to permit the deck to be fully withdrawn and removed from frame 154.

Although not shown herein, it will be appreciated that a suitable electronic flexible connecting device, such as a ribbon connector, or the like, may be coupled to the rear of record/playback deck 150 to provide the necessary electrical power, control and communication signals to the deck. This relatively flexible electrical connection permits the deck to be withdrawn without damaging the electrical connection thereto.

Cassette Guide

From the description set forth above with respect to elevator 70, it is appreciated that a cassette is lowered onto record/playback deck 150 by platform 86 of elevator 70. For proper operation of the cassette, that is, to facilitate the recording and/or playing back of messages, it is important that the cassette be loaded properly onto the deck. That is, the cassette should exhibit proper registration with the usual drive spindles (i. e. the supply and take-up spindles) and with the capstan that typically are provided on the deck, and also with various guide elements, such as guide pins, that also may be provided. When using various small cassettes, such as microcassettes or the cassettes described in U.S. Pat. No. 4,443,827, the tolerances for locating the cassette in proper registration on record/playback deck 150 are quite small. Advantageously, a cassette guide is provided with record/playback deck 150 to facilitate the proper loading and registration of a cassette on the deck.

Figure 19:
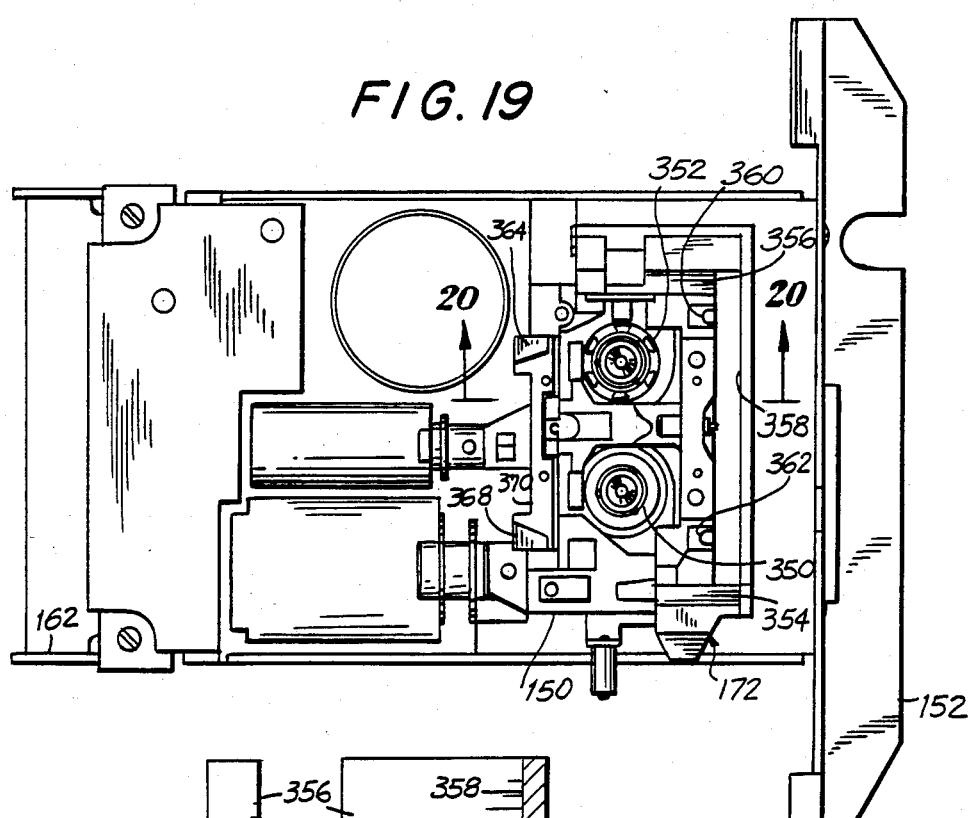
FIG. 19 is a top plan view of the record/playback deck and cassette guide of the present invention.
Figure 20:
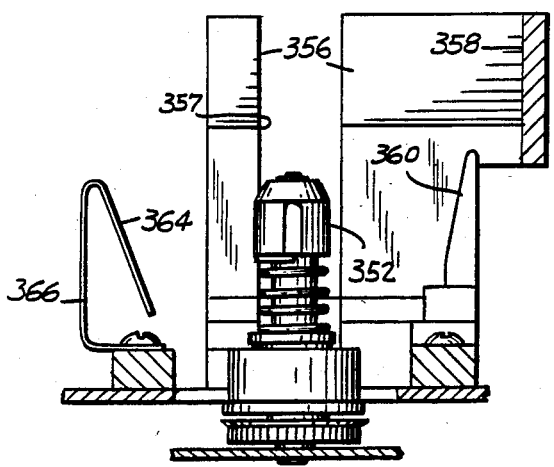
FIG. 20 is a sectional view taken along lines 20—20 in FIG. 19.
Figure 21:
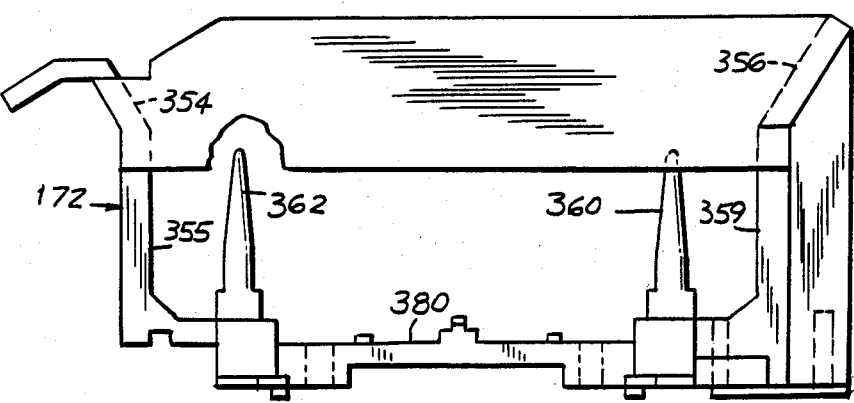
FIG. 21 is a front view of the cassette guide.

Referring to FIG. 19, a top plan view of record/playback deck 150 is illustrated, including the usual supply and take-up drive spindles 350 and 352 normally provided on a cassette deck. Cassette guide 172 also is shown in FIG. 19, this guide being formed of a pair of laterally spaced angular guide ramps 354 and 356, a front abutment or stop 358 and a pair of rear guide elements 364 and 368. As can be seen from FIG. 20, which is a sectional view taken along lines 20—20 in FIG. 19, and also from FIG. 21, which is a front view of cassette guide 172, the cassette guide preferably appears as a frame of one-piece construction and is formed of plastic, ABS, or other material that can be readily molded. As can be seen from FIG. 21, guide ramp 354 is provided at the upper portion of a leg 355, the latter extending upward from floor or base 380 of the cassette guide. Likewise, ramp 356 is provided on a leg 359 which also extends upward from base 380 of the cassette guide. As illustrated in FIG. 20, leg 359 is provided with a slot 357 to accommodate claw 94 of hold-arm 90 when elevator 70 lowers a cassette on platform 86 onto record/playback 150.

A pair of guide pins 360 and 362 extend upwardly from base 380 and are adapted to engage matching holes or apertures normally provided on, for example, standard cassettes and microcassettes. The registration of guide pins 360 and 362 and the matching apertures on such cassettes properly align the cassette on the record/playback deck. These guide pins are positioned in juxtaposition to spindles 350 and 352 and to the capstan normally provided on typical record/playback decks.

By providing cassette guide 172 as a molded unit, that is, by molding guide ramps 354 and 356, guide pins 360 and 362 and base 380, proper tolerances and positioning of these members with respect to each other are assured. Then, by locating guide pins 360 and 362 at the locations normally provided for such guide pins on typical cassette decks, the entire cassette guide 172 is properly positioned or "keyed" to the spindles and capstan with proper tolerances.

As shown in FIG. 19, a pair of rear guide elements 364 and 368 are secured to base 380 by, for example, screws. In one embodiment, rear guide elements 364 and 368 are formed of resilient material, such as spring metal. These rear guide elements are of substantially similar construction and, as shown in FIG. 20, guide element 364 is illustrated as an inclined ramp which terminates from an L-shaped upstanding member. A bridge section 370 may extend between rear guide elements 364 and 368, as shown in FIG. 19, thus simplifying the stamping and formation of the rear guide elements. Of course, if desired, a single rear guide element may be used. Also, the guide elements may be formed of other resilient materials and need not be limited solely to spring metal.

In operation, as elevator platform 86 lowers a cassette toward record/playback deck 150, one or the other or both of the side edges of the cassette contact guide ramps 354 and 356, respectively, of cassette guide 172. These guide ramps serve to adjust the position of the cassette on platform 86, as needed, to align the usual supply and take-up reel hubs with the supply and take-up drive spindles of the deck.

As the platform continues to lower the cassette onto the deck, hold-down arm 90 rides within slot 357 of upstanding leg 356. The guide openings, or apertures, normally provided in the bottom wall of the cassette receive guide pins 360 and 362, thereby properly registering the cassette with respect to the drive spindles, capstan and heads normally provided on the deck.

As the cassette is lowered further, rear guide elements 364 and 368 contact the lower rear edge of the cassette so as to provide further guidance thereto. It is appreciated that hold-down arms 90 and 92 urge the cassette in a direction to overcome the spring force exerted on the rear edge thereof by guide elements 364 and 368. The spring force exerted by these guide elements tends to urge the cassette in the forward direction such that the front edge thereof engages front abutment 358. Thus, the cassette is loaded with proper registration onto record/playback deck 150 and, moreover, the cassette is urged in the forward direction by the spring force exerted thereon by rear guide elements 364 and 368 to position the cassette in proper location to receive the usual head and pinch-roller for normal recording and playback operations.

While the present invention has been particularly shown and described with respect to a preferred embodiment thereof, it will be readily appreciated by those of ordinary skill in the art that various changes and modifications may be made. For example, a respective input hopper, output hopper, and priority hopper have been illustrated as being formed as vertical hoppers to store vertical stacks of cassettes. Alternatively, such hoppers may take the form of horizontal hoppers; and adjustments to accommodate the horizontal movement of a cassette may be made in the apparatus that has been described above. Furthermore, although desirable, the use of blocking member 134 may be omitted. However, this blocking member advantageously prevents the inadvertent dislocation of a cassette from output hopper 42 to interfere with record/playback deck 150. Still further, it is appreciated that modifications and changes in design details may be made, as desired.

Advantageously, a single cam 240 is used to coordinate the operations of pusher arm 60 and elevator 70 without requiring electronic control over separate motors to effect such coordination.

It is intended that the appended claims be interpreted as including the preferred embodiment described above as well as variations and modifications which will become apparent to those of ordinary skill in the art. The terms of the claims thus should not be viewed as limiting the present invention solely to such terms, but rather, the claims are intended to cover equivalents of the disclosed structure.

What is claimed is:

1. Changer apparatus of the type having an input hopper for storing a plurality of recording media and a spaced apart output hopper for storing recording media that have had messages recorded thereon by a recording deck and comprising pusher means for pushing a recording medium out of said input hopper; elevator means disposed beneath said output hopper for receiving the recording medium pushed from said input hopper and for lowering same onto said recording deck for the recording of a message thereon, said elevator means being further operable to lift the recording medium from said recording deck into said output hopper; rotable cam means coupled to said pusher means for reciprocatingly driving said pusher means to push a recording medium out of said input hopper to said elevator means, said cam means having a cam surfact operable to drive said elevator means while said pusher means is driven, and cam follower means coupled to said elevator means and driven by the cam surface of said cam means for vertically driving said elevator means to lift one recording medium from said recording deck into said output hopper and then to receive the next recording medium pushed from said input hopper by said pusher means and then to lower that recording medium onto said recording deck.

2. The apparatus of claim 1 wherein said pusher means comprises a pusher arm.

3. The apparatus of claim 2 wherein said pusher arm is coupled to said rotatable cam means by a pin connection.

4. The apparatus of claim 3 further comprising a fixed pivot axis, said pusher arm being pivotally connected to said pivot axis and said pusher arm being driven by said rotatable cam means through said pin connection to pivot about said pivot axis and thereby reciprocate between opposite extreme positions as said cam means makes one complete rotation.

5. The apparatus of claim 4 wherein said pusher arm includes a groove in which said pin connection rides as said cam rotates.

6. The apparatus of claim 5 wherein said groove exhibits variable depth and said pusher arm is angled such that, as said pin connection rides in said groove, said pusher arm is driven in a direction substantially normal to the direction in which said pusher arm reciprocates.

7. The apparatus of claim 1 in which said pusher means comprises a pusher arm pivotable about a fixed pivot axis and having a groove therein; a pin connection for coupling said pusher arm to said rotatable cam means, said pin connection riding in said groove to drive said pusher arm substantially in a plane of withdrawing movement between an initial position whereat said pusher arm moves into engagement with a recording medium in said input hopper and a withdrawal position whereat said pusher arm has brought the engaged recording medium to said elevator means and then back to said initial position during one complete rotation of said can means; said pusher arm being angled and biased toward said pin connection and said groove exhibiting variable depth such that during the return of said pusher arm to said initial position, the pusher arm is displaced from said plane of withdrawing movement so as not to interfere with said input hopper or the recording medium stored therein.

8. The apparatus of claim 1 wherein said input hopper comprises a vertical stack of recording media; and said pusher means comprises a pusher arm pivotable about a fixed axis and means for coupling said pusher arm to said cam means to move in a first horizontal plane from an initial position to a withdrawal position, to push the bottommost recording medium out of the input stack as said cam means rotates and to return in a second horizontal plane from said withdrawal position to said initial position as the cam means completes a single rotation.

9. The apparatus of claim 8 wherein the recording media in said input stack are shifted downwardly when the bottommost recording medium is pushed out therefrom; and wherein said second horizontal plane is disposed below said first horizontal plane.

10. The apparatus of claim 1 wherein said elevator means has a platform for supporting a recording medium; said cam means includes an irregular surface having a peak, a trough, and an intermediate portion; and wherein said cam follower means rides on said irregular surface to raise said platform when said cam follower means rides up to said peak, to lower said platform toward said recording deck when said cam follower means rides down to said trough, and to position said platform at a receiving position when said cam follower means rides to said intermediate portion.

11. The apparatus of claim 1 wherein said elevator means includes a platform for supporting a recording medium, support means for supporting said platform, said support means being coupled to said cam follower means, and a guide means coupled to said support means for guiding movement of said elevator means; said elevator means further includes at least one hold-down arm for maintaining a recording medium on said platform and means for moving said hold-down arm away from said recording medium to enable said recording medium to be lifted to said output hopper.

12. The apparatus of claim 11 wherein said hold-down arm is pivotable about an axis parallel to the direction of movement of said platform; and said means for moving said hold-down arm includes pivot drive menas for driving said hold-down arm to pivot about said axis.

13. The apparatus of claim 12 wherein said hold-down arm is provided with an inclined surface on a portion thereof; and wherein said pivot drive means comprises a contacting member fixedly disposed in the path of movement of said hold-down arm for contacting said inclined surface when said elevator means raises said platform from said recording deck to said output hopper and thereby pivot said hold-down member about said axis.

14. The apparatus of claim 11 further including a blocking member coupled to said support means and positionable in a blocking configuration for preventing the inadvertent dislocation of a recording member from said output hopper to said platform.

15. The apparatus of claim 14 wherein said blocking member is pivotally coupled to said support means; and further including means in the vicinity of said output hopper to pivot said blocking member out of said blocking configuration when said elevator means raises said platform from said recording deck to said output hopper.

16. The apparatus of claim 1 further including priority removal means selectively operable to remove a predetermined recording medium from said output hopper.

* * * * *